(12) United States Patent
Fischel

(10) Patent No.: US 7,972,747 B2
(45) Date of Patent: Jul. 5, 2011

(54) DIRECT REACTION FUEL CELLS UTILIZING TAYLOR VORTEX FLOWS

(75) Inventor: Halbert Fischel, Santa Barbara, CA (US)

(73) Assignee: Global Energy Science, LLC (California), Santa Barbara, CA (US)

( * ) Notice: Subject to any disclaimer, the term of this patent is extended or adjusted under 35 U.S.C. 154(b) by 0 days.

(21) Appl. No.: 12/800,672

(22) Filed: May 20, 2010

(65) Prior Publication Data
US 2010/0330459 A1 Dec. 30, 2010

Related U.S. Application Data

(60) Provisional application No. 61/220,583, filed on Jun. 26, 2009.

(51) Int. Cl.
*H01M 8/04* (2006.01)
(52) U.S. Cl. .................. 429/513; 429/454
(58) Field of Classification Search .......... 429/400, 429/428, 454, 472, 476, 498, 499, 512, 523, 429/51
See application file for complete search history.

(56) References Cited

U.S. PATENT DOCUMENTS

| | | | | |
|---|---|---|---|---|
| 5,830,593 A | * | 11/1998 | Nielson | 429/410 |
| 6,319,293 B1 | * | 11/2001 | Debe et al. | 29/623.3 |
| 6,471,392 B1 | | 10/2002 | Holl et al. | |
| 7,488,547 B1 | * | 2/2009 | Iacovelli | 429/434 |
| 2006/0062702 A1 | | 3/2006 | Hagemeister et al. | |
| 2007/0020142 A1 | * | 1/2007 | Federspiel et al. | 422/45 |
| 2008/0149050 A1 | | 6/2008 | Shih et al. | |

OTHER PUBLICATIONS

Newman, Electrochemical Systems, Third Edition, John Wiley & Sons, Inc., Hoboken, NJ, USA, © 2004, Chapter 1—Introduction, §1.4 Transport, pp. 8-18.
Gabe et al, The rotating cylinder electrode: a recent development, Reviews of Applied Electrochemistry 6, J. of Applied Electrochemistry 13 (1983) pp. 3-22.
Gabe et al, The rotating cylinder electrode: its continued development and application, Reviews of Applied Electrochemistry 49, J. of Applied Electrochemistry 28 (1998) pp. 759-780.
Bagotsky, Fundamentals of Chemistry, Second Edition, John Wiley & Sons, Inc., Hoboken, NJ, USA, © 2006, §4.4—Convective Transport, pp. 60-67.
Newman, Electrochemical Systems, Third Edition, John Wiley & Sons, Inc., Hoboken, NJ, USA, © 2004, Chapter 17—Convective-Transport Problems, §17.3-§17.8, pp. 382-399.
Taylor, Stability of a Viscous Liquid Contained Between Two Rotating Cylinders, Philosophical Transactions of the Royal Society of London. Series A, Containing Papers of a Mathematical of Physical Character, vol. 223 (1923) pp. 289-343.

* cited by examiner

*Primary Examiner* — Jennifer K. Michener
*Assistant Examiner* — Carlos Barcena
(74) *Attorney, Agent, or Firm* — Sheldon L. Epstein; Malcolm J. Chisholm, Jr.; Pamela J. Curbelo

(57) ABSTRACT

Direct reaction fuel cells (10) and fuel cell batteries (200) with rotating electrodes (18) that generate Taylor Vortex Flows (54) and Circular Couette Flows (56) in electrolyte chambers (24) are disclosed.

70 Claims, 8 Drawing Sheets

AXIAL    FLOW

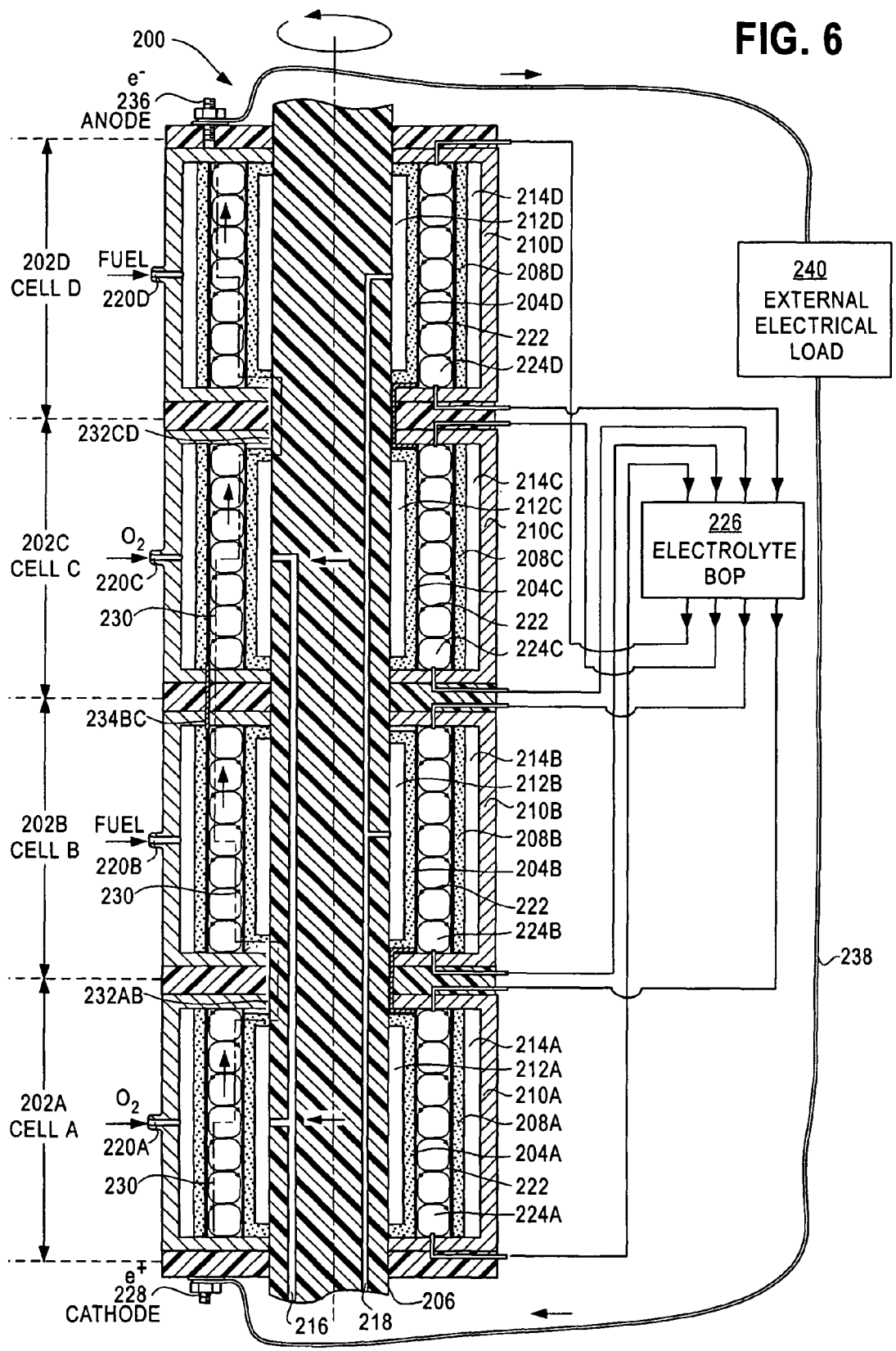

DIRECT REACTION FUEL CELLS UTILIZING TAYLOR VORTEX FLOWS

CROSS-REFERENCE TO RELATED APPLICATIONS

This application claims the benefit of my U.S. Provisional Application No. 61/220,583 filed 26 Jun. 2009, which is incorporated herein by reference.

This application, identified as Case D, is related to my following applications of Halbert P. Fischel:

Case A: Electrochemical Cells Utilizing Taylor Vortex Flows, application Ser. No. 12/800,658, now Publication No. US 2010/0330439 A1 of 30 Dec. 2010;

Case B: Fuel Reformers Utilizing Taylor Vortex Flows, application Ser. No. 12/800,710, now Publication No. US 2010/0330445 A1 of 30 Dec. 2010;

Case C: Chemical Process Accelerator Systems Utilizing Taylor Vortex Flows, application Ser. No. 12/800,657, now Publication No. US 2010/0329947 A1 of 30 Dec. 2010; and Case E: Dynamic Accelerated Reaction Batteries Utilizing Taylor Vortex Flows, filed application Ser. No. 12/800,709, now Publication No. US 2010/0330460 A1 of 30 Dec. 2010, with Philip Michael Lubin and Daniel Timothy Lubin.

Case A, Case B, Case C, Case D (this case) and Case E were all filed on the same day. All of these applications have been assigned to the same assignee. The other applications are incorporated herein by reference.

STATEMENT REGARDING FEDERALLY SPONSORED RESEARCH OR DEVELOPMENT

Not Applicable

THE NAMES OF PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF INVENTION

1. Field of the Invention

This invention is in the field of Direct Reaction Fuel Cells used to convert chemical energy in high-hydrogen-content fuels directly into electrical energy without burning them for heat energy or reforming them for production of $H_2$ and having means to provide relative motion between an electrode and an electrolyte—including means for rotating an electrode (U.S. Class 429/67-69, Int. Class H01M), to achieve accelerated chemical reaction rates promoted by Taylor Vortex Flows (TVF) and Circular Couette Flows (CCF).

2. Description of Related Art

Direct Reaction Fuel Cells (DRFC) such as Direct Alcohol Fuel Cells (DAFC), Direct Methanol Fuel Cells (DMFC), Direct Borohydride Fuel Cells (DBFC) that convert chemical energy in high-hydrogen-content fuels directly into electrical energy are well known. High-energy-content fuels include:

alkanes (paraffins)—methane, ethane, propane, butane, octane;
alcohols—methanol, ethanol, propanol, butanol;
kerosene; and
borohydrides—$LiBH_4$, $NaBH_4$, $KBH_4$.

These fuels are easily usable gasses, liquids or powders that can be dissolved in liquids. While they provide operational advantages over $H_2$ fuel cells, existing DRFC have low energy and power densities per dollar that make them commercially uncompetitive.

One reason that prior art DRFC cannot compete commercially with $H_2$ fuel cells is that most existing DRFC require a solid polymer Proton Exchange Membrane (PEM) to prevent fuel-oxidizer crossover in electrolyte between anode and cathode electrodes. As a consequence, all commercially usable PEM for DRFC are based upon essentially acidic electrolyte because alkaline based membranes have not proven to be stable in DRFC environments. Extremely high temperature Solid Oxide Fuel Cells SOFC have limited application to DRFC and suffer from low power density due to the slow transport of ions across the solid membrane.

Acidic electrolytes in DRFC are slow and promote intermediate reaction products that increase polarization voltages at electrodes, which dramatically reduce power levels. Acidic electrolytes also support reactions that yield undesirable products that can poison electrodes and contaminate DRFC waste streams.

Hydrocarbon fuels, such as methane, alcohols and kerosene, and $NaBH_4$ both have high energy densities per unit weight and unit volume. For example, methanol is capable of generating 1.21 volts and 6 electrons @ 700 kilo-Joules per mole (kJ/mole) and $NaBH_4$ can provide 1.64 volts and 8 electrons @ 1271 kJ/mole based upon their respective reversible Gibbs free energies. Nevertheless, these yields cannot be obtained in prior art DRFC because hydrocarbons and $NaBH_4$ have relatively slow oxidation catalyst reactions with acidic electrolytes that are required for use with PEMs.

Hydrocarbon and $NaBH_4$ DRFC have potentials to produce markedly higher power and energy densities if an alkaline electrolyte could be used because polarization and poisoning would be reduced. However as described above, there are no durable alkaline-electrolyte-compatible ion exchange membranes that can prevent fuel-oxidizer crossover in higher power DRFC.

As described in Case A, fuel cells comprise an anode electrode reactive with a hydrogen-based or reducing fuel and a cathode electrode reactive with an oxidizer. The electrodes are separated from each other by an electrolyte fluid that transports, 1) protons from the anode to the cathode where they react with both the oxidizer and with electrons travelling from the anode through an external electrical circuit to the cathode to form a compound, such as water or 2) hydroxyl ions from the cathode to the anode to form water there.

Fuel cells rely on molecular kinetics, e.g., temperature, reactant concentration and catalysis to induce molecules to react at a catalytic surface. Prior art teaches that there are five principal methods to increase reaction rates and thereby increase output current. They are 1) raise temperature and/or pressure, 2) improve catalyst activity, 3) augment electrode surface activity by adding other forms of resonant energy to electrodes or to reactants (e.g., U.S. Pat. No. 7,482,072 to Brooks et al), 4) increase reactant transport rates to or from reaction surfaces (mass transport) and 5) raise the catalyst surface area/electrode area ratio.

Operational data for prior art fuel cell electric currents disclose that these currents do not exceed 1.0 ampere/$cm^2$ and generally are in a range of 0.4 to 0.8 ampere under load at about 0.75 volt. This equates to about 0.3 to 0.5 watt/$cm^2$ of anode or cathode surface. Some of the more common limits are imposed by a) mass-transport losses of ions moving through electrolytes, b) surface losses at catalysts caused by intermediate reaction products attracted to active sites, c)

mass-transport losses of fuel, oxidizer and ions moving within electrodes to reach catalysts where they can react and d) overpotential decrement due to limited catalyst activity.

SUMMARY OF THE INVENTION

A common belief about fundamental principles governing operation of a fuel cell is that the PEM or another membrane must be present to conduct ions selectively from one electrode to the other. That is false. Prior art PEMs are used to prevent unprocessed fuel and oxidizer from crossing a gap between anode and cathode while allowing an ion to cross. An ion's charge and direction is dictated by an internal cell balance for the external electron current.

The presence of the PEM significantly increases the cell's internal resistance to ionic flow and consequently reduces the cell's current capacity. While, it is known that PEMs need to be eliminated in order to improve cell performance, prior art techniques such as creating laminar flows in electrolytes do not substantially improve fuel cell performance.

Some prior art electrochemical cells that do not have or require PEMs incorporate rotating or moving electrodes that generate flows to the electrode surfaces. However, these electrodes are found only in applications where an electrode is immersed in an electrolyte bath to expose it to an aggregation of reducing agent, oxidizer and electrolyte. It is well known that use of moving electrode surfaces in such systems produces turbulence to enhance reactant mixing. Turbulence is basically incompatible with operation of energy-efficient fuel cells.

This invention provides DRFCs that are substantially more powerful than prior art systems and can compete for investment because they eliminate a need for PEM and accommodates use of either acidic or alkaline electrolytes.

This disclosure will describe three types of fuel cells that use circulating liquid electrolyte without a PEM; namely:

Acid-electrolyte direct methanol fuel cell ("DMFC") fueled with 100% methanol and using recirculating acidic electrolyte. This direct reaction fuel cell ("DRFC") is the most powerful and long range liquid-fueled fuel cell for use in vehicles. It's only undesirable characteristic is a molecule of $CO_2$ exhaust produced for every molecule of methanol consumed; however, methanol derived from bio-fuel will yield a net carbon footprint of virtually zero. The example is equally applicable to ethanol.

Alkali-electrolyte DMFC fueled with methanol or ethanol and using recirculating alkali electrolyte. While $CO_2$ can be eliminated from the cell's exhaust by forming precipitating carbonates in the cell's waste stream, the precipitates must be retained for disposal. Further, an additional tank is required for resupplying makeup alkali electrolyte to replenish that converted to carbonate and water. Its mileage is approximately 130% better than the acidic-electrolyte DMFC.

DBFC fueled by $NaBH_4$ liquefied in a stabilizing alkali electrolyte. Although dilution in electrolyte is required, it's substantially higher energy content per mole produces about the same amount of energy in kilo-watt-hours per net gallon of fuel as the undiluted methanol fuel cell; but, it has no polluting exhaust. While $NaBH_4$ is an easily-handled powder, it has a higher cost than other fuels. Nevertheless, it may be preferred for special applications.

All of these fuel cells of this invention use Taylor Vortex Flows ("TVF"—also known as Taylor-Couette Flows) to achieve enhanced reaction rates by a) reducing mass-transport losses, b) preventing fuel and oxidizer crossover, c) capturing reaction products that can degrade catalysts and electrolytes, d) eliminating those degrading reaction products from the cells, e) increasing temperature to reduce electrode overpotentials and raise reaction rates and f) permitting higher pressures and concentrations to accelerate reactions at both electrodes.

TVF can occur when a viscous fluid (e.g., electrolyte) is confined in a gap between two cylinders where one cylinder is rotating with respect to the other. For low differential angular velocities, in terms of circumferential Reynolds number, $R_c$, the flows are steady, purely azimuthal and known as Circular Couette Flows (CCF).

Electrodes described here use TVF that automatically generate accelerated, high-shear-rate, stable laminar CCF at the electrode surfaces. These laminar flows increase electrode surface electrical current density while preventing a mixing of fuels and oxidizers that would waste energy and lower conversion efficiency. Recommended electrodes that present high surface area/projected area ratios of catalytic surfaces to reactive chemicals are described in Case C and below.

In 1923, Sir Geoffrey Ingram Taylor published a groundbreaking paper on stability of the Couette flow. He reported that when the differential velocity, between the opposing cylinder surfaces forming a gap, is increased to a range within observed minimum and maximum speeds, Couette flow becomes unstable. Then, a secondary steady-state is created that is characterized by contra-rotating, axisymmetric, toroidal vortices with unique properties. This secondary steady-state is known as TVF.

Mechanical systems generating TVF are well known in the prior art of particulate filtration. For example, the following U.S. patents, hereby incorporated herein by reference, describe systems employing TVF for filtering blood without clogging a plasmapheresis membrane filter:

| # | Date | Title | Inventor |
| --- | --- | --- | --- |
| 4,755,300 | July 1988 | Couette Membrane Filtration Apparatus . . . | Fischel, R et al. |
| 4,808,307 | February 1989 | Couette Membrane Filtration Apparatus . . . | Fischel, R et al |
| 4,919,817 | April 1990 | Blood Cell Washing Systems & Method | Schoendorfer et al |
| 5,034,135 | July 1991 | Blood Fractionation System & Method | Fischel, H. |
| 5,053,121 | October 1991 | Blood Cell Washing System & Methods | Schoendorfer et al |
| 5,194,145 | March 1993 | Method . . . For Separation of Matter . . . | Schoendorfer |
| 5,376,263 | December 1994 | Pump Control Apparatus . . . Rotating . . . | Fischel, H. |
| 5,464,534 | November 1995 | Blood Fractionation System & Method | Fischel, H. |
| 5,738,792 | April 1998 | Method For Separation of Matter . . . | Schoendorfer |
| 5,783,085 | July 1998 | Blood Fractionation Method | Fischel, H. |

Particulate filters are readily distinguished from electrochemical cells, such as fuel cells, because 1) the filters lack electrodes and 2) the direction of flow of reactant fluids is diametrically opposite to that of fuel cells.

In particulate filters such as these blood filters, a fluid, such as blood, containing a suspended particulate, such as blood cells, is pumped through a gap between opposing cylinder walls. One wall, usually the outer, is solid while the other is porous. The porous wall usually incorporates filter media and rotates within the outer wall. Fluid penetrates the filter media on the inner wall where TVF-accelerated high-shear-rate laminar flow prevents particulates from entering and clogging the filter media pores. TVF trap the particulates and transport them to an exit from the gap to be purged from the system.

Electrochemical cells, such as fuel cells, of this invention comprise different structures and employ TVF in a different manner. For example, fuel cells incorporate porous anode and cathode electrodes separated by electrolyte. Fuel and oxidizer pass, respectively, from chambers behind their associated electrodes toward the electrolyte; but, do not react with each other in the electrolyte or with the opposite electrode because 1) electrolyte TVF keep them separated and 2) they are in this invention almost fully converted to ions within their respective electrodes. Fluid media, contaminants or reaction byproducts are not expunged from fuel or oxidizer entry chambers because they are eliminated when the electrolyte is recycled outside of the cell.

This disclosure describes systems and methods for management of any type of fluid electrolyte as well as fuel and oxidizer in electrochemical cells. Cells of this invention have fuel, oxidizer and ionic conductivities that are orders of magnitude greater than prior art cells so that ionic transfer time between electrodes and fuel/oxidizer/ion access to catalyst surfaces that have been a combined mass transport limitation of electrical-current-producing chemical reactions now are negligible.

For cells incorporating PEM electrolytes, the dominant limitation on ionic conductivity is the rate at which a single ion dragging several water molecules can migrate through a polymer molecular structure while two phases; namely a) ions dissolved in liquid, and a gas can arrive at one electrode or b) water molecules and gas at a different electrode can attach to a third phase solid catalyst surface, react and depart as water (steam or condensed liquid) or ions in solution, respectively.

U.S. Pat. No. 6,713,206 issued to L. J. Markoski et al and a paper by R. Ferrigno et al (JACS Communications, vol. 124, 2002, pp. 12930-12931, "Membraneless Vanadium Redox Fuel Cell Using Laminar Flow") teach that a laminar boundary layer on the electrode surface has a protective effect preventing fuel/oxidizer crossover. In order to maintain laminar flow in the cited art, electrolyte velocities must be kept sufficiently low so that the critical turbulent Reynolds Number, Re, (not $R_c$), is not exceeded. The present invention of this disclosure succeeds because its cells have electrolyte velocities that result in much higher circumferential Reynolds Numbers, $R_c$, and high laminar shear rates stabilized by generated TVF. Because a requirement for laminar flow can be achieved at much higher laminar shear rates using TVF, as taught here, fuel cells of this invention achieve multiple orders of magnitude higher current densities than non-TVF laminar flow cells.

The controlling factor for laminar shear rates is the minimum value of the hydro-dynamically defined Taylor number, $T_c$ above which desirable energetic vortices are fully established within the electrolyte or, in some cases, the gaseous fuel as well. Axial Poiseuille-type flow can be further imposed by virtue of recirculation. Also, there is a strong dependence of the critical $T_c$ on the strength of the latter flow by way of its characteristic axial-flow Reynolds number, $R_a$.

Furthermore, there is a requirement to maintain laminar flow at electrode surfaces while promoting TVF within the electrolyte. Care must be taken to restrict the circumferential Reynolds number, $R_c$, to non-turbulent values. A set of distinct variables define a particular range of permissible operating parameters. These variables include predetermined ranges of: 1) temperature, 2) kinematic viscosity of the fluids being employed, 3) respective rates of recirculation, 4) angular rotation speed, 5) surface characteristics of the electrodes and 6) physical dimensions of the cell.

Given appropriate operating parameters, neither gaseous fuels, oxidizers, gaseous reaction products nor particle precipitates of the redox reaction at the electrodes can penetrate the TVF. Consequently, fuel crossover is effectively prevented, even though fuel, oxidizer, reaction products and particulates are driven by forced convection directly through their respective porous electrodes directly toward TVF in the electrolyte. Only redox product ions in solution can enter the electrolyte and cross rapidly to the opposite electrode, which is an important feature of electrochemical cells utilizing TVF in electrolyte.

In the case of liquid fuels and oxidizers, such as used in direct methanol and borohydride fuel cells, unreacted liquid fuel or oxidizer should not enter the electrolyte in solution. Optimum results are obtained when residence times of the fuel and oxidizer spent within the catalyzed reaction zones of their respective electrodes exceed their corresponding reaction times to ensure that substantially all the material is processed before the electrode-permeating reaction products, including dissolved ions, enter recirculating electrolyte.

Fuel cells that use methanol, selling for US 12½¢/liter, as fuel would be an economical replacement for internal combustion engines and batteries in vehicles if cell power density could be increased. My inventions of Direct Reaction Fuel Cells (DRFC), such as my Direct Methanol Fuel Cells (DMFC) and a Direct Alcohol Fuel Cells (DAFC) utilizing TVF overcome low performance of prior art DRFC. TVF DMFC can use 100% undiluted methanol or ethanol to achieve an exceptionally high power per unit of electrode surface.

The present invention is a robust electrochemical cell containing a fluid electrolyte between relatively rotating, co-axial cylindrical electrodes that cause Taylor Vortex Flows (TVF) within the electrolyte. TVF eliminates any need for a PEM to prevent crossover of fuel and oxidizer chemicals through the electrolyte.

It is therefore a first object of the present invention to provide a robust electrochemical cell that eliminates any need for a PEM or any other membrane disposed between electrodes.

A second object of the present invention is to provide a robust electrochemical fuel cell and method for converting electrochemical energy into electrical energy through the use of TVF that capture and eliminate reaction byproducts and prevents crossover of fuel and oxidizer in the cells' electrolytes.

A third object of this invention is to provide structure for an electrochemical cell that will optimize its performance as a fuel cell for converting chemical energy of a fuel into electrical energy that can be used to power an external electrical circuit or load.

A fourth object of this invention is to provide DRFC that create dynamic flows within all fluid constituents to induce exceptionally high rates of mass transport to and from several redox chemical reactions.

A fifth object of this invention is to provide DRFC with low mass-transport-limiting and surface-limiting electrode characteristics.

A sixth object of this invention is to provide DRFC capable of operating at substantially elevated temperatures that achieve enhanced reaction rates with inexpensive catalysts.

A seventh object of this invention is to provide DRFC batteries that produce higher voltage electrical energy with lower losses.

These and other objects of this invention are more fully set forth in the following description of a preferred embodiment of this invention.

BRIEF DESCRIPTIONS OF THE SEVERAL VIEWS OF THE DRAWINGS

FIG. 6 is a cross-sectional view of a preferred embodiment of a Direct Reaction Fuel Cell battery comprising a series of connected cells.

DETAILED DESCRIPTION OF THE INVENTION

Direct Reaction Fuel Cell Structure

Figure 1A:
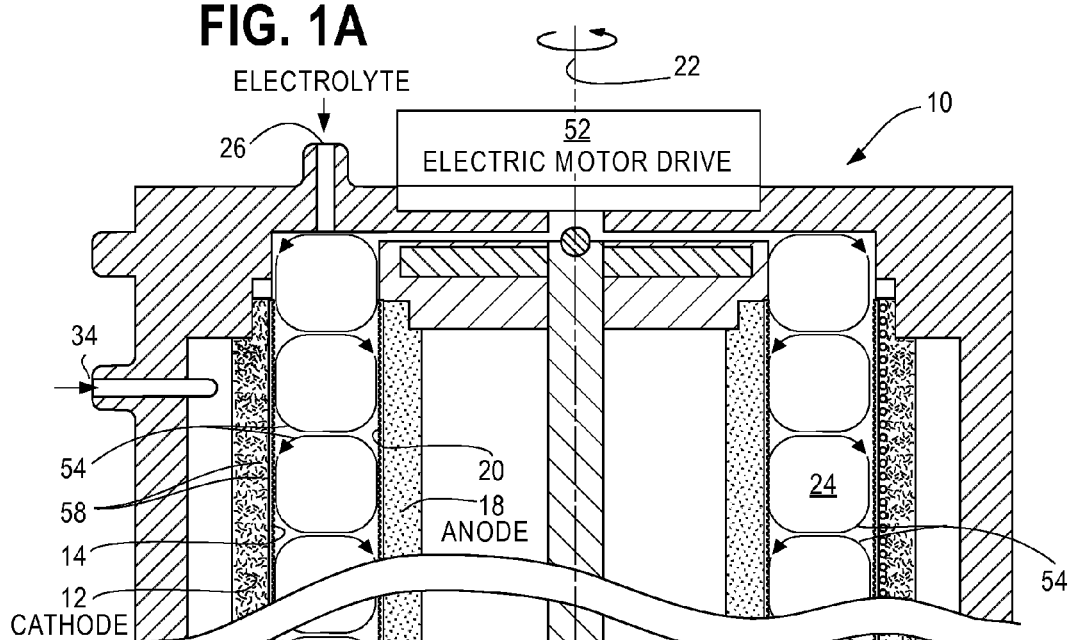
FIG. 1A is a fragmentary, cross-sectional view of a preferred embodiment of a Direct Reaction Fuel Cell.

FIG. 1A is a cross-sectional view of essential features of a preferred embodiment of an acid electrolyte DRFC 10 of this invention that generates electrical energy from high-hydrogen-content fuels, such as 100% methanol, without need of a fuel reformer to extract $H_2$ by converting hydrogen and oxygen into electrical energy and water.

DRFC 10 comprises a fixed cylinder 12 serving as the cell's cathode electrode and having a porous inner catalytic surface layer 14 on its inner wall. The surface is three-dimensional and has depth to accommodate a reaction zone. Cylinder 12 is fixed to metal frame 16 of cell 10 so that it cannot rotate and so that it may conduct electricity to the frame 16.

DRFC 10 also comprises a rotating cylinder 18 serving as the cell's anode electrode and having a porous outer catalytic surface layer 20 on its outer wall. As for the cathode catalytic surface layer 14, the anode catalytic surface layer 20 also is three-dimensional and has depth to accommodate a reaction zone. Cylinder 18 is journaled to spin around axis 22 within the fixed cylinder 12.

Cylindrical electrodes 12 and 18 are shown in the drawings as right-circular and coaxial; however, these attributes are not a requirement and other cylinder-like geometries (e.g., elliptical, conical, hyperbolic, irregular, different axes) may be employed. Also, it is practical to build DRFC where the inner cylinder 18 is fixed and the outer cylinder 12 rotates or both cylinders rotate at different speeds or directions. All that is required is that one of the cylindrical electrodes 12 and 18 rotates relative to the other so that there is a rotational speed difference between the cylindrical electrodes 12 and 18.

The porous inner catalytic cathode surface layer 14 of the fixed cylinder 12 has a radius $r_2$. The porous outer catalytic anode surface layer 20 of the rotating cylinder 18 has a radius $r_1$. An electrolyte chamber 24 having a gap of width $d=r_2-r_1$ is formed between the catalytic surface layers 14 and 20.

The electrolyte chamber 24 is in fluid communication with electrolyte input tube 26 that can be connected to a source (not shown) of electrolyte. An electrolyte exit tube 28 is also provided for draining electrolyte, unreacted fuel or oxidizer, water and carbon, from the electrolyte chamber 24.

The cathode electrode fixed cylinder 12 porous inner surface layer 14 is supported by a cylindrical outer porous metal web 30 that provides both structural backing from and electrical conductivity to the metal frame 16. The outer surface of the porous metal web 30 is in fluid communication with oxidizer manifold 32. The oxidizer manifold is connected to oxidizer input tube 34 that can be connected to a source (not shown) of oxidizer.

Preferred oxidizers include purified air or a liquid such as hydrogen peroxide, depending on choice of fuel. The oxidizer penetrates through the porous outer metal web 30 at its outer (first) surface 31 and then moves into porous cathode electrode catalytic (second) surface layer 14. Multiple catalyst particles embedded within the pores of the cathode electrode layer 14, disclosed in Case C and below, then participate with the electrolyte in a three-phase (catalyst-oxidizer-electrolyte) reaction with the oxidizer entering the pores to produce hydroxide ($OH^-$ ions) at the cathode electrode's inner surface layer 14.

High-energy-content fuel enters the DRFC 10 through fuel input tube 36 and passes into fuel manifold 38. The fuel manifold 38 is in fluid communication with the rotating cylinder 18 anode electrode inner (first) surface metal web 40 that supports the porous outer catalytic surface layer 20. The fuel penetrates through the porous inner metal web 40 at its inner surface 41 and then moves into porous anode electrode catalytic (second) surface layer 20. Multiple catalyst particles embedded within the pores of the anode electrode surface layer 20, disclosed in Case C and below, then participate with the electrolyte in a three-phase (catalyst-fuel-electrolyte) reaction with the fuel, a reducing agent or reductant, entering its pores to produce protons ($H^+$ ions) at the anode electrode's outer surface layer 20.

The inner surface metal web 40 also conducts electrical current to collector ring 42. The collector ring 42 conducts electrical current to collector brush 44 that is part of electrical terminal 46 insulated from and extending through the metal frame 16 as the DRFC 10 negative terminal −. Electrical terminal 48 is the DRFC 10 positive terminal +, which is electrically connected to the cathode inner surface metal web 30 and porous outer catalytic surface layer 20 through the metal frame 16. The electrical terminals 46 and 48 are connected to an external electrical circuit load 50.

The DRFC 10 is operated to produce electricity for transmission to the external electrical circuit load 50 by a process comprising:

1. Pumping electrolyte through electrolyte input tube 26 into electrolyte chamber 24;
2. Pumping a high-hydrogen-content fuel through the fuel input tube 36 into the fuel manifold 38 and through the anode inner surface metal web 40 and anode porous outer catalytic surface layer 20;
3. Pumping oxidizer through the oxidizer input tube 34 into the oxidizer manifold 32 and through the cathode outer surface metal web 30 and cathode porous inner catalytic surface layer 14;
4. Powering electric motor drive 52 to rotate the anode cylinder 18 at a rate sufficient to cause Taylor Vortex Flows 54 and Circular Couette Flows 56 to form in the electrolyte chamber 24;
5. Draining electrolyte containing $H_2O$ and any $CO_2$ gas created by the fuel cell 10 acid electrolyte chemical reaction, as well as any unreacted fuel or oxidizer from the electrolyte chamber 24.

Creation of the TVF 54 and CCF 56 in the fuel cell electrolyte chamber 24 provides four significant operational advantages, namely:

Elimination of a need for PEM to prevent fuel/oxidizer crossover;

Exceptionally high-shear-rate laminar electrolyte flow (CCF) 56 at the electrode catalytic surface layers 14 and 20 (see FIG. 1B) to facilitate chemical reaction mass transport coupled with accelerated ionic transport between electrodes, all cooperating to promote faster chemical reactions and high electrical current densities;

Elimination of reaction byproducts (e.g., water, heat) with electrolyte circulation; and Direct access of trans-electrode fuel and oxidizer to catalyst surfaces.

These four principal advantages translate into higher power and energy densities in terms of both size and weight over prior art fuel cells.

Generally, electrode surface layers 14 and 20 are coextensive, both circumferentially and axially. The gap d between facing surfaces in the electrolyte chamber 24 may vary somewhat by imparting a slightly cylindrical-conical shape, not shown, to either or both surfaces in order to establish a uniform pressure in axially flowing fluid contained within the chambers 24.

In every case, in accordance with the invention, electrolyte, whether or not recirculated for reuse, is contained within the electrolyte chamber, 24, between one stationary surface layer 14 and one facing spinning surface layer 20. Rotation of the spinning cylinder 18 imparts energetic, but non-turbulent TVF 54 and CCF 56 in the electrolyte immediately upon entry of the fluid into its chamber 24.

The three-phase chemical reaction of catalyst surface layers 14 and 20, electrolyte and fuel or oxidizer is both temperature-dependent and exothermic. Fuel, electrolyte or oxidizer may be heated initially by balance-of-plant (BOP) or by internal heaters.

Taylor Vortex Flows

Figure 2A:
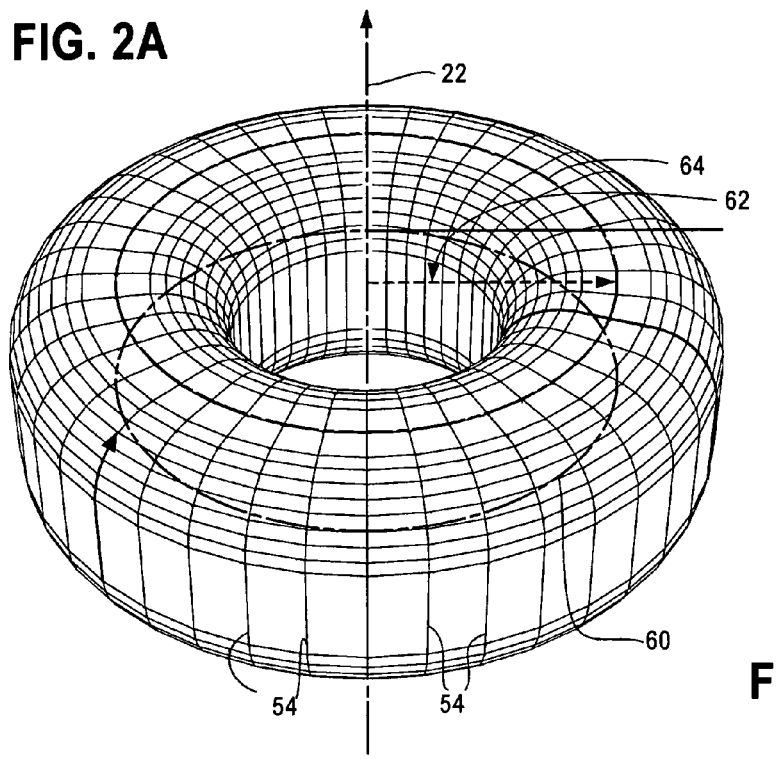
FIG. 2A, FIG. 2B and FIG. 2C are detailed illustrations of a Taylor Vortex Flows in a fuel cell.
Figure 2B:
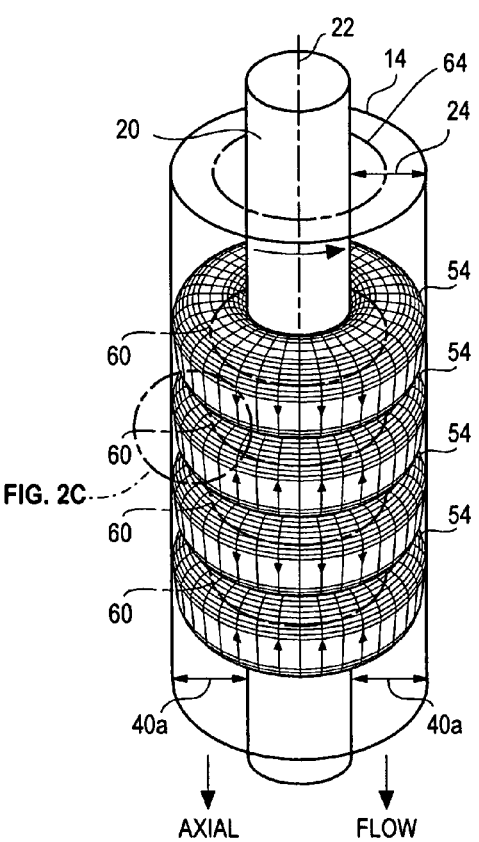
Figure 2C:
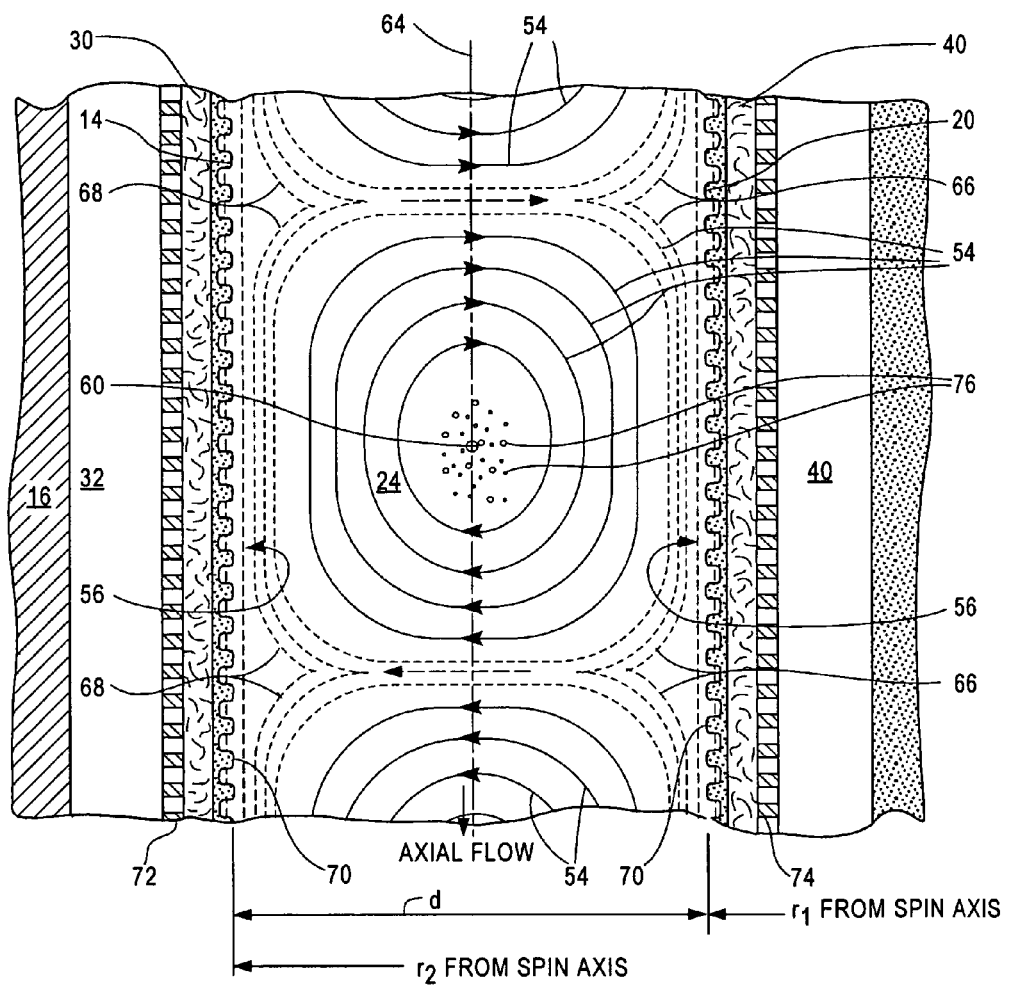

FIG. 2A, FIG. 2B and FIG. 2C are more detailed and somewhat idealized illustrations of Taylor Vortex Flows (TVF) between one set of facing active surfaces—such as fuel cell 10 electrode surface layers 14 and 20. The vortex flows 54 resemble doughnuts or, more technically, tori of fluid that spin around their own axes 60. These tori spin axes 60 define planes that are perpendicular to the cross-section view plane of FIG. 2C. The vortex radii 62 extend from the cell's spin axis 22 to the center 64 of electrolyte chamber 24 between the respective stationary and spinning surface layers 14 and 20.

As shown in FIG. 2B, several vortex flows 54 form an array that extends along the full axial length of the electrolyte chamber 24. Each vortex 54 is contra-rotating with respect to its adjacent vortex 54. Diameters of vortexes 54 are slightly less than the width of the electrolyte chamber 24.

Of critical importance to the invention is the fact that the entire array of vortices 54 is enveloped by the high-shear-rate Circular Couette laminar flow boundary layer 56 (FIG. 2C) 56 of spinning fluid almost fully covering each of the adjacent electrode 12, 18 surface layers 14 and 20 that enclose the array of vortices 54. Thin layers of fluid are moving with high laminar shear perpendicularly to the sectional plane of FIG. 2C.

In the case of the spinning surface layer 20, fluid moves most rapidly at and with that surface and least at the transition to vortex flow 66 a small distance away. In the case of the stationary surface layer 14, fluid moves most rapidly at the transition from vortex flow 68 and effectively zero at the stationary surface layer 14; again within a small distance.

The high velocities of these CCF laminar boundary layer 56 flows and the very small distances over which they occur will produce extremely high shear rates and consequently large mass transport coefficients. The invention takes further advantage of these very desirable CCF 56 by incorporating active catalytic surface layers 14 and 20 with protuberances 70 of catalytically-active material that extend into the high-shear laminar CCF 56 shown in FIG. 2C and disclosed in Case C and below. This greatly increases the amount of catalytic surface exposed to the high shear flow.

The porous catalytic surface layers 14 and 20 preferably are made of electrically conducting isotropic nanoporous copper or gold foam sponges or carbon filamentary material. The surface layer 14 may be pre-coated with polytetrafluoroethylene (PTFE) to render the surface layer 14 hydrophobic to the oxidizer. Both of the surface layers 14 and 20 contain catalytic nanoparticles firmly attached to their open cell interconnecting surfaces. The PTFE pre-coating could be used for the anode surface layer 20 in some fuel cell applications where the fuel is used in the form of a vapor.

As described above, the surface layers 14 and 20 are supported by the micro-porous metal webs 30 and 40 for supporting surface layers 14 and 20 and conducting large electrical currents. Heavy electrical current conduction can be enhanced by backing the porous metal webs 30 and 40 with porous metal grids 72 and 74.

An important feature of the TVF is illustrated in FIG. 2C where particles from a precipitate, including water attached to the precipitate (e.g., $NaBO_2$) and bubbles from either electrode surface layers 14 or 20 introduced into electrolyte chamber 24 are drawn into the centers of TVF 54. The particles and bubbles 76 are formed during operation of the fuel cell 12a. The particles and bubbles 76 are not in actual solution as part of the electrolyte and are therefore subject to the flow dynamics just described. They will experience high pressure gradients caused by the fluid electrolyte TVF 54. These high gradients appear in both the high shear laminar CCF streams 56 and within the vortices 54. The TVF 54 quickly drive the particles and bubbles 76 to the centers of the nearest vortices 54 where they remain trapped.

TVF 54 are individual vortex entities that move in axial flow through the electrolyte chamber 24. The particles and bubbles 76 trapped within vortices 54 are forced out of the electrolyte chamber 24 along with their host vortex 54. Thus, TVF 54 constitute means for extracting unwanted contaminants 76 from the electrolyte. These unwanted contaminants 76 may include reaction precipitates, water, vapor, $CO_2$ and any gasses exiting either electrode, any of which can degrade the electrolyte if allowed to remain within it.

As shown in FIG. 1A, one side of the electrolyte chamber 24 is the cylindrical (or slightly conical) anode porous outer catalytic surface layer 20 at radial distance, $r_1$ from the spin axis of rotation 22 about which it spins at an angular rate, $\Omega_1$. The other side of the electrolyte chamber 24 is the cylindrical (or slightly conical) cathode porous inner catalytic surface layer 14 at radial distance, $r_2$ from cell spin axis of rotation 22, which spins at an angular rate $\Omega_2$. In this embodiment, the surface layer 14 is fixed and $\Omega_2=0$; however, embodiments where $\Omega_2 \neq 0$ are also practical.

The gap thickness, $d=r_2-r_1>0$ is defined above as the distance between the two surface layers 14 and 20. As used herein, the term 'gap' is synonymous with the width, d, of the electrolyte chamber 24.

As derived from Lathrop, Daniel P., et al, "Transition to shear-driven turbulence in Couette-Taylor flow.", Physical Review A, vol: 46, No. 10, (Nov. 15, 1992), pp; 6390-6404, the circumferential Reynolds number, $R_c$, for fluids contained in a gap between a moving member having rotational speed $\Omega_1>0$ and a fixed member having speed $\Omega_2=0$ is defined as:

$$R_c = \{\pi(RPM)r_1 d/30v\} \leq 10^4 \qquad \text{Equation \& Condition (1)}$$

where:
$\Omega_1 = [2\pi(RPM)/60]$ radians/second; and
$v$ = kinematic viscosity = $\mu$(poise)/$\rho$(grams/cc.)

The condition that $R_c \leq 10^4$ is required for well-formed Taylor Vortex Flows so that fluid flow contained within the gap d be non-turbulent. The condition that these vortices exist in a form required by the invention can be written as the following lower limit for the critical Taylor number, $T_c$ at which the characteristic vortices begin to form:

$$T_c = 2r_1(\pi/30)^2 d^3 (RPM)^2/v^2(2+\{d/r_1\}) \geq 1,715(f\{R_a\}) \qquad \text{Equation \& Condition (2)}$$

where:
$f\{R_a\}$ is a function derived in Chandrasekhar, S., "The hydrodynamic stability of viscid flow between coaxial cylinders", Proc. Nat. Acad. Sci., vol: 46, No. 1, (1960) pp. 141-3 and reported to be experimentally verified in R. J. Donnelly and D. Fultz, "Experiments On The Stability Of Spiral Flow Between Rotating Cylinders", ibid. No. 8, pp; 1150-1154 [see their FIG. 1 on page 1153]; and
$R_a$ = the axial Reynolds number for Poiseuille-type axial recirculation flow through the gap, d.

A convenient way to express $R_a$ is:

$$R_a = (dL/v)(\dot{U}/U) \qquad \text{Equation (3)}$$

where:
L is the axial length of the active porous member(s),
U is the volume of fluid in the gap of thickness, d,
$\dot{U}$ is the volumetric rate of axial flow from one end of the gap to the other, and
$\dot{U}/U$ is the rate of exchange of all the volume in the gap.

A convenient numerical expression for $f\{R_a\}$ is:

$$f\{R_a\} = 1.0 + (0.297)(\log_{10} R_a)^{4.04342} \text{ for } R_a > 1.0$$

$$f\{R_a\} = 1.0 \text{ for } 0 \leq R_a \leq 1.0$$

The two Conditions, (1) and (2), defined above should be met for optimum operation. They do not restrict design parameters to specific values; but rather, permit a fairly broad range of permitted values that can be chosen to satisfy other desirable conditions.

For example, it may be desirable to limit torque driving the spinning member so that it does not consume an appreciable fraction of the power generated. The thickness of the laminar high shear boundary layer on the facing surfaces of each of the porous members can be chosen for optimal mass transport characteristics. The equations that define these properties are:

Torque, T was defined in Lathrop, Daniel P. et al, "Transition to shear-driven turbulence in Couette-Taylor flow.", Physical Review A, vol: 46, No. 10, (15 Nov. 1992), pp; 6390-6404 as:

$$T = (0.202)\rho v^2 L(r_1 R_c/d)^{5/3} \qquad \text{Equation (4)}$$

Therefore, the power expended in spinning the inner member per $cm^2$ of surface area is:

$$W = (7.834)\rho v^{1/3}(r_1)^{7/3}(RPM)^{8/3} \times 10^{-12} \text{ Watts/cm}^2 \qquad \text{Equation (5)}$$

The respective stable boundary layer thicknesses, $\delta_1$ and $\delta_2$ are:

$$\delta_1 = (28.45)(v/RPM)^{2/3}(r_1)^{-1/3} \qquad \text{Equation (6a)}$$

$$\delta_2 = (1.29)(1+\{d/r_1\})\delta_1 \qquad \text{Equation (6b)}$$

Neither the power expended, W, nor the boundary layer thicknesses, $\delta_1$ nor $\delta_2$, depend on the gap dimension, d, between the two porous surfaces. $\delta_2$ is a function of $r_2$. The nominal shear rate without TVF would be $\Omega_1 r_1/d$; but, the shear rate with TVF, for $\Omega_2=0$, is $\Omega_1 r_1/\delta_1$ and $\Omega_1 r_2/\delta_2$ for the two surfaces, respectively.

Thus, shear at each surface is multiplied by factors of:

$$d/\delta_1 = 0.03515(v/RPM)^{-2/3}(r_1)^{1/3} d; \text{ and}$$

$$d/\delta_2 = 0.775(d/\delta_1)/(1+d/r_1).$$

If d is small compared to $r_1$, then stable laminar shear at the outer stationary surface is only slightly less than at the spinning one.

Figure 3:
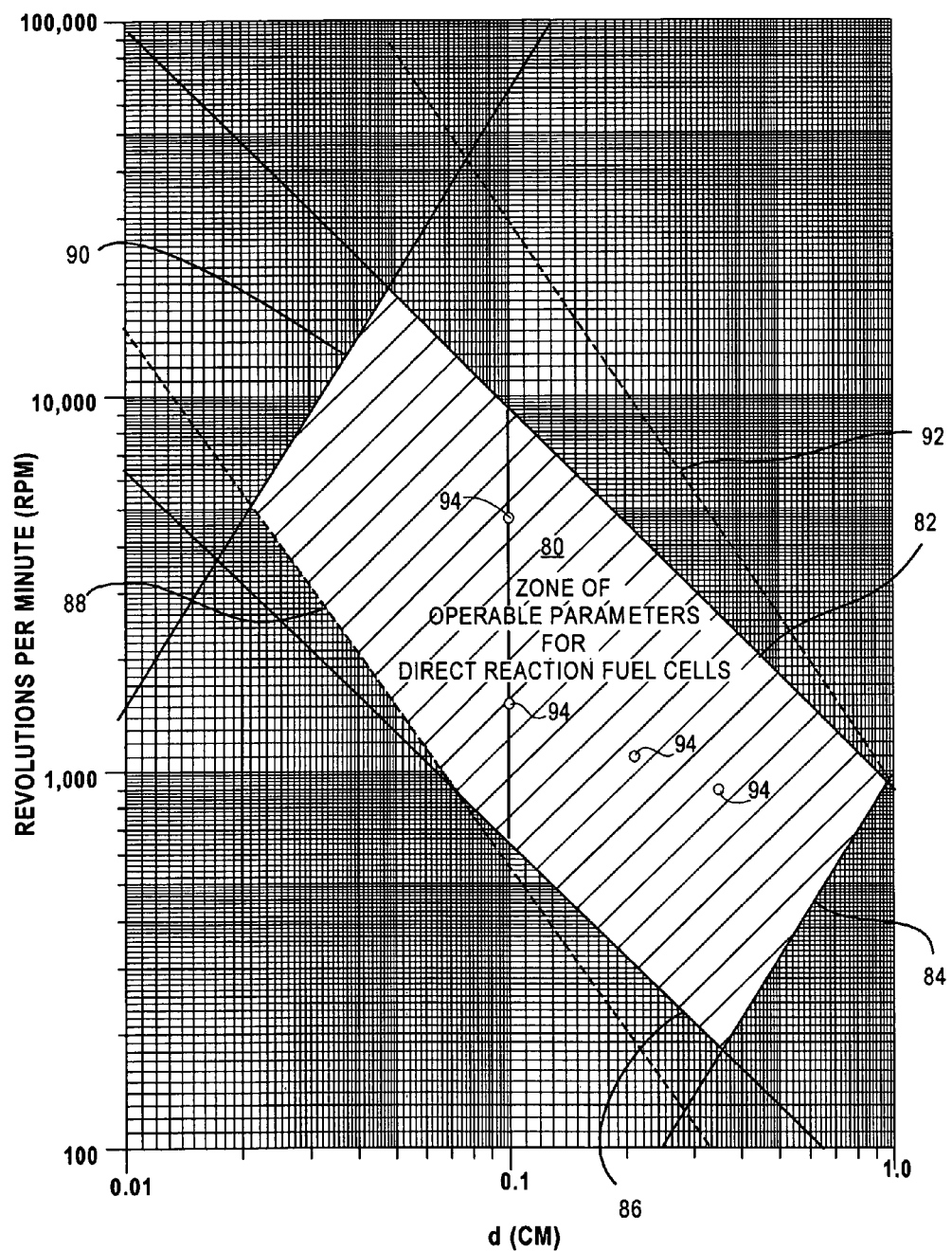
FIG. 3 is a log-log graph of Revolutions Per Minute (RPM) as a function of gap width, d, for a range or zone of operable conditions.

FIG. 3 is a log-log graph of Revolutions Per Minute (RPM) as a function of gap width, d, for various operating conditions. A Zone of Operable Parameters 80 is bounded by the following six conditions for $0.0067 \leq d/r_1 \leq 1.0$ shown as plot lines:
82—$R_c \leq 10^4$ and $r_1 \geq 1$ cm;
84—$R_c \leq 10^4$ and $r_1 \leq 3$ cm (0.05 watt/$cm^2$);
86—$R_c \geq 2000$ and $r_1 \geq 3$ cm;
88—$R_c \geq 2000$ and $r_1 \leq 3$ cm;
90—$R_c \geq 2000$ and $r_1 \geq 3$ cm (0.05 watt/$cm^2$); and
92—$T_c \leq 10^4$ and $r_1 \geq 1$ cm.
Coordinates of typical operating values are shown as circles 94 in the Zone 70.

U.S. Pat. No. 5,783,085 awarded for my invention of a Blood Fractionation Method discloses a process for separating plasma from whole blood with TVF. It describes the nature of the vortices and the boundary layer thicknesses $\delta_1$ and $\delta_2$, defined by Equations 6a & 6b, that envelop them and as illustrated in FIG. 2A. FIG. 2B and FIG. 2C.

My '085 blood plasma collection machine is used to remove undesirable suspended particulates from a fluid. The machine incorporates an inner spinning membrane filter to pass selectively fluid component to be separated from a particulate suspension without having particulates plug pores in the membrane.

A vortex will act on any particulate discontinuity with a pressure gradient that drives the particle to the low pressure center of the vortex axis. This occurs whether the particle is a buoyant bubble or denser component, such as particles and bubbles 76 of FIG. 2C. This is a feature that is especially useful for trapping carbon particles being discharged from the hydrogen cracking pyrolysis in the fuel reformer of Case B.

Ions, on the other hand, are in solution and move hydrodynamically with the fluid or are driven by concentration differences through diffusion accelerated by shear forces. In the case of membrane filtration of suspensions, some particles will be forced against the membrane into the boundary layer which is often referred to as concentration polarization. Although the liquid component is trying to drag particles into and through the pores of the membrane, the extremely high shear rate, referred to above, creates what amounts to a fluidized bed of relatively, but not totally, compacted particles through which the liquid passes.

The maximum rate of liquid filtration (absent fully compacting the polarization layer that would drive the particles into and through the pores) is a linear function of the boundary layer shear rate. The reason membrane filtration of suspensions is so effective with TVF is due to that amplified boundary layer shear rate.

$H^+$ and $OH^-$ ions are carried convectively by TVF from one electrode to the other in the DRFC 10 at a prodigious rate that is far greater than could ever be achieved in a solid polymer PEM or other stationary electrolyte. Once they have arrived near an electrode catalytic surface layer (e.g., 14 or 20), they are subjected to exceptionally energetic shear in laminar CCF 56 covering the electrode which, for most common electrolyte liquids, will be shown to be somewhat thinner than solid membranes or an otherwise stationary electrolyte.

It is shear-enhanced diffusion in the laminar boundary layer that transports ions and reaction products to and from the surface of the catalyst. Because roughly-silo-shaped, finger-like protuberances 70 of catalyst-bearing, porous electrode surface layers 14 and 20, illustrated in FIG. 2C, extend into the laminar flow layer 56, ions have both a shorter path to travel and a faster diffusion rate. The diffusion rate increases rapidly as a function of shear stress in a viscous fluid.

Electrolyte is able to penetrate deeper into the catalyst invested pore bed without flooding it by virtue of its flow profile around and over the electrode protuberances 70 and flow and capillary pressure into their meso- and micro-pores, respectively. Neither convective transport nor accelerated diffusion in combination with higher effective catalyst loading per unit electrode interface area is possible with prior art static electrolyte systems or chemical reaction vessels. Some numerical examples are now described.

In cases where acid or alkaline electrolytes will probably be most productively employed, the kinematic viscosity and specific gravity for them will be on the order of $10^{-2}$ stoke and about 1.5, respectively, over a range of 100° to 350° C. Vapor forms of methanol and ethanol at 250 to 350° C. and 10 bar (150 psi) have corresponding kinematic viscosities on the order of 0.06 to 0.08 stoke.

Methane, $CH_4$, propane, $C_3H_8$, methanol, $CH_3OH$, and ethanol, $C_2H_5OH$ are among the more suitable choices for fuels in DRFC because they have very high free energy density, are widely available and are simpler molecules to break. There are other hydrocarbons that have similar concentrated energy properties.

DRFC engineering procedure starts with calculation of a reasonable value for the parameters of Equation 5 to limit power burden to a small fraction of power generated. The density and viscosity of fluids used in DRFC is not very high and therefore power burden should not be critical.

Construction of DRFC 10 requires mathematical analysis of physical design and operable parameters to select useful values that can be applied to a specific design or embodiment. When the fluid in question is liquid there is a special condition that needs to be imposed, namely, that the power required to spin the rotating member not be too great a fraction of the power produced. Applying this condition to typical electrolytes used in DRFC 10 and choosing a reasonable range of rotating member diameters (e.g., $r_1$ and $r_2$ of FIG. 1A and FIG. 2C) will yield an acceptable design and values within a 'Zone of Operable Parameters' 80 of FIG. 3 where RPM is plotted on log-log axes against gap width, d.

Using the stated physical properties, FIG. 3 displays logarithmic plots of Equation 5 for rotational power decrement of 0.05 watt/cm² used to spin the rotating element (e.g., rotating anode cylinder 18 of FIG. 1A). This is less than 1% of an expected power density of 5 to 10 watts/cm² in a TVF fuel cell. By comparison, conventional fuel cells produce only 0.3 to at most 1.0 watt/cm².

When gas is disposed in a chamber (e.g., 24) between rotating and stationary surface layers (e.g., 14 and 20), several criteria that limit the range of design parameters for liquids, such as acid and alkaline electrolytes, are much easier to meet. While kinematic viscosities for methane, air and $CO_2$ are nearly an order of magnitude larger than for the liquids, corresponding specific gravities are somewhat more than two orders of magnitude lower. Since the expended rotational power density varies as $\rho v^{1/3}$, power required to spin the rotating member (e.g., 18) is very much less and can be ignored.

The 'Zone of Operable Parameters' area 80 of FIG. 3 covers a range of non-turbulent Reynolds numbers, $R_e$, from 2000 to $10^4$ and values of spinner radius (e.g., $r_1$ in FIG. 1A and FIG. 2C) from about 1 cm to 3 cm. The range of permissible values of gap width, d, in relation to RPM lies between these plot lines 92, 82, 86 and 88. In addition, (Conditions 1 & 2) are shown on the same graph as plot lines 84 and 90. Together, these plot lines form a central 'Zone of Operable Parameters' 80. The 'Zone of Operable Parameters' 80 is understood to indicate practical; but not necessarily exclusive, system design parametric values within which useful TVF may be obtained without turbulence.

For example, one might want to limit the motor speeds to 1800 or 3600 RPM, which are standard 60 Hz electric motor speeds in North America. The range of suitable values for gap, d, appears in FIG. 3 to be about 0.05 to 0.15 cm; but, a wider gap dimension, $d=r_2-r_1$, facilitates higher critical Taylor number, $T_c$, and consequently higher allowed recirculation rates in accordance with the combined application of Equations 2 & 3. This is particularly useful in one configuration that removes water product with the recirculated electrolyte as to be described below.

The plot lines 88 and 92 in FIG. 3 bound minimum critical Taylor numbers, $T_c$, which slightly further limit the operable range of values. The boundary layer thicknesses for typical design parameters such as d=0.1 cm and $r_1$=2 cm. are next calculated.

If there is a reason to construct a miniature device with $r_1 \approx 1$ cm and d≈0.1 cm, then the criteria for establishing TVF would be met for RPM>1000. To ensure flows will not be turbulent, 1000<RPM<6500.

For larger devices where $r_1 \approx 5$ cm and d≦1 cm, there is no difficulty satisfying the Taylor criterion. To avoid turbulence, the RPM should be <1100.

The following table provides some representative values:

| Motor Speed (RPM) | $R_c$ | $\delta_1$ (mm) | Shear Multiplier |
|---|---|---|---|
| 1800 | 3770 | 0.071 | 14.12 |
| 3600 | 7540 | 0.045 | 22.40 |

The range of boundary layer thickness values are somewhat less than, but nearly the same as, currently used in PEM solid polymer membranes. A major difference is the rate of shear-amplified diffusion compared to polymer interstitial transport.

Typical laminar boundary layer shear for DRFC 10 results in a "Shear Multiplier", as shown above, of as much as 15 to over 20-times the nominal value of $r_1\Omega_1/d$ for a conventional fuel cell. The value of $1/\nu$ will be on the order of 100 sec/cm² and gap, d, in the range of about 0.1 cm. $R_a$ will be roughly 10 times the product of the length of a chamber such as 24 and volumetric exchange rate. If that product is on the order of 10 or 20 (e.g., a meter length can change volume every 5 to 10 seconds, etc.), then it is possible to hold $R_a$ to 200 or less so that a value of $T_c > 10^4$ will be sufficient in nearly all cases to ensure the establishment of effective TVF.

Boundary layer thickness calculations provide an estimate of ionic conductivity through TVF between electrodes. Clearly, the convective mass transport of the vortices themselves is orders of magnitude beyond relevance and will be ignored. For purposes of this calculation, the value of ionic conductivity in siemens/cm is a primary parameter and is understood to equal (amperes/cm²)/(volts/cm).

Actual performance of conventional solid-polymer PEM cell plate stacks provides ionic conductivity values that are typically (0.6)/(0.65/t) where t is the thickness of the polymer membrane. Thickness is described in prior art as $0.005 \leq t \leq 0.01$ cm. Therefore, the ionic conductivity of a PEM for H⁺ ions must be about $4.6 \times 10^{-3}$ to $9.2 \times 10^{-3}$ siemens/cm. Values of ionic conductivity for liquid electrolytes at low viscous shear are on the order of 20 to $100 \times 10^{-3}$ siemens/cm. Given the shear stress multiple of the boundary layer as calculated above, it is clear that ionic diffusion driven by concentration gradients and linearly multiplied by shear rate at the catalyst surface is a further order of magnitude beyond typical cell electrolyte values. For these reasons, ionic conductivity can also be ignored as a limiting factor controlling ionic transport between electrode catalytic surface layers 14 and 20 in a DRFC incorporating TVF and CCF.

The ionic conductivity calculations above indicate that rate limiting reactions occur mainly within the electrode catalytic surface layers 14 and 20. There is a relationship of current as a function of a dimensionless ratio of reaction-time:residence-time, where reaction-time, $t_a$, is the time required for chemical components of a fluid to react with the multiple embedded catalyst particle surfaces in an electrode to form ions and residence-time, $t_r$, is the time that the fluid is in an electrode catalytic surface layer 14 or 20 reaction zone.

The electrical current function becomes approximately asymptotic at a maximum current when (10× reaction-time) <residence-time. When reaction-time:residence-time≈1/10, then mass transport within the electrode catalytic surface layer 14 or 20 reaction zone does not limit the rate of current producing chemistry. Means for controlling entry of a chemical into pores of an electrode so that reaction-time:residence-time <1/10 may include controls for adjusting fluid pressures in the electrolyte chamber 24 or the manifolds 32 and 38.

This criterion can be applied to a Pt-surface-catalyzed reaction as follows:

$$W_a = \rho_m \cdot \gamma \cdot E_v \cdot NF(z/t_r) \qquad \text{Equation (7a)}$$

$$t_a \leq \rho_m \cdot \gamma \cdot E_v \cdot NF(z/10 \cdot W_a) \qquad \text{Condition (7b)}$$

where,
$W_a$=electrode interface watt density;
$\rho_m$=molar density of reactants, i.e., fuel and reacting ions;
$\gamma$=void fraction of the porous structure (usually about 60%);
$E_v$=voltage produced at the electrode (usually about 25% of the total at the cathode and the rest at the anode);
N=number of electrons produced in the reaction so that NF is the coulomb charge per mole of reactants,
F=Faraday constant
z=depth of the reaction zone at the interface surface of the electrode;
$t_a$=reaction time reactants require to produce ions; and
$t_r$=residence time that reactants spend in the reaction zone.

The criterion for achieving maximum current density, $I_m$, is for the time it takes for the molecules to react at the catalyst surface, $t_a$ to be no more than 10% of $t_r$. Applying characteristic values for various fuel cell types to Equation 7b, it is apparent that there is an area-multiplying benefit in the design of TVF electrodes (e.g., 34 and 36). For m=4:1 as explained below (see Electrode Catalytic Surfaces And Chemical Process Accelerator Systems), a projected value of 10 watts/cm² is achieved with a value of $W_a$ of only 2.5 watts/cm².

Values of $\rho_m$, $E_v$, and N for the anode of a $H_2/O_2$ fuel cell, are typically, 0.035 moles/ml, 0.75 volts and 2 electrons, respectively. The value of z is half the diameter of an electrode protuberance or $6 \times 10^{-4}$ cm. The result for $t_a$ is $\leq 73$ milliseconds.

For a direct methanol or borohydride fuel cell, presented later, the comparable values are 0.0275 moles/ml, 1.24 volts and, respectively, 6 or 8 electrons yielding $t_a$=360 milliseconds and 10 watts/cm² for methanol fuel cells and $t_a$=180 milliseconds and 20 watts/cm² for borohydride fuel cells. These calculations are used to design appropriate electrode catalyzed reaction zone depths and related residence times at the anode catalytic surface layers 20 of these high power fuel cells.

Residence time is controlled by driving fuels and oxidants directly through their respective electrodes having selected active catalyzed reaction zone electrode thickness at a prescribed flow rate. This is only possible if the electrolyte captures and conveys reaction products out of the fuel cell as provided by this invention.

For fuel cell spin rates used in the examples, the Taylor number, $T_c$, is so far above a critical value that it is not necessary to restrict the volumetric recirculation rate as dictated by Equation 3. The volumetric recirculation rate will ultimately be determined by the molar rate of water production or reaction product gas load that needs to be extracted from the cell and exhausted from a separate chamber as steam and gas.

The boundaries of the Zone 80 also define several limiting conditions. For example, there are no useful designs for gap widths d<0.02 cm or d>1.0 cm or for spin rates $\Omega$<200 RPM or $\Omega$>20,000. Zone 80 displays practical values for a gap width d=0.1 cm. and 1800≤RPM≤3600. Larger gaps on the order of $0.2 \leq d \leq 0.3$ cm. will require spin rates $\Omega \approx 1,000$ rpm.

For the normalized parameter, $0.0067 \leq d/r_1 \leq 1.0$, spinner diameters should be in the range of $1 \leq r_1 \leq 6$ cm. Smaller or larger diameters will only have a small effect on the stated ranges and are unlikely to be preferred in most DRFC 10 applications.

Electrode Catalytic Surface Layers and Chemical Process Accelerator Systems

Catalytic surface layers working together with CCF form Chemical Process Accelerator Systems that are described in Case C. Details of Direct Reaction Fuel Cell catalytic electrode surface layers (14 and 20) surface structures and CCF are described here.

FIG. 4A, FIG. 4B, FIG. 4C, FIG. 4D, 4E and FIG. 4F illustrate catalyst structures optimized for high liquid and gas phase contact per unit area of catalyst/fluid interface in high-shear-rate laminar CCF 56 generated by TVF 54. These figures illustrate how to provide catalyst surfaces that provide intimate contact with a vigorously flowing electrolyte. Mass transport of ions by diffusion through stagnant liquid in conventional electrochemical cells is far slower than the movement of ions to (and product from) the catalyst surface layers 14 and 20 adapted for use with high-shear-rate laminar fluid flows with high rates of viscous shear.

Figure 1B:
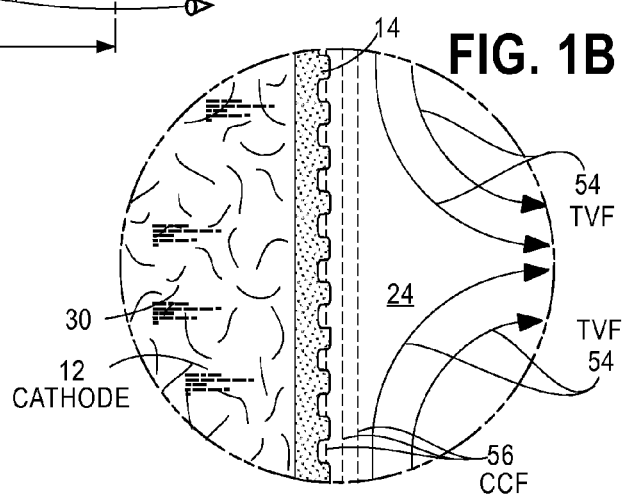
FIG. 1B is a magnified view of a portion of FIG. 1A showing a portion of the cell's cathode electrode.
Figure 4A:
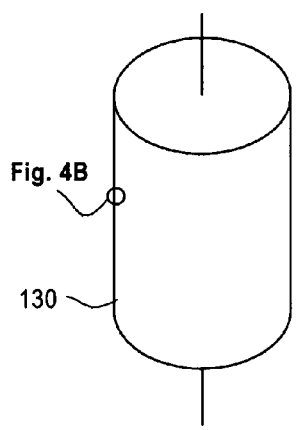
FIG. 4A is a perspective view of a catalytic fuel cell electrode of this invention.
Figure 4B:
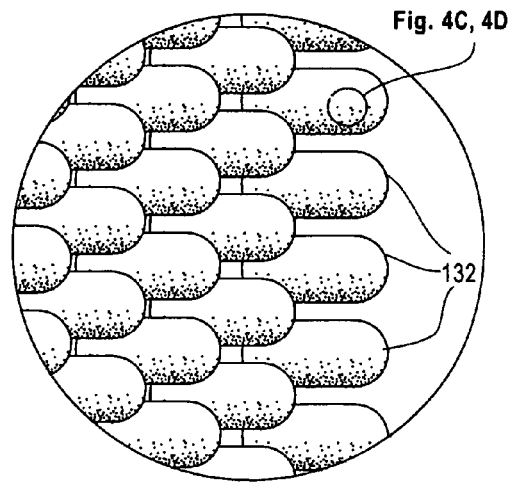
FIG. 4B is a perspective and magnified view of the surface of the electrode of FIG. 4A.

FIG. 4A is a view of a cylindrical catalyst surface 130, such as catalytic surface layers 14 or 20. A magnified view of the surface 130 is shown in FIG. 4B, where protuberances 132 are in a HCP array that may be formed by embossing the surface of the cylinder 130. The protuberances 132 have heights of approximately 25 μm and widths (diameters) of about 12 μm are shown extending from the cylinder 130 on a densely covered surface. Those heights are sufficient to reach well into the laminar shear boundary layer 56 of FIG. 2C; but, no higher to avoid damage to the protuberances 132 from high-velocity TVF 54. The protuberances 132 are also shown in FIG. 1B where they extend into high-shear-rate CCF 56.

Figure 4C:
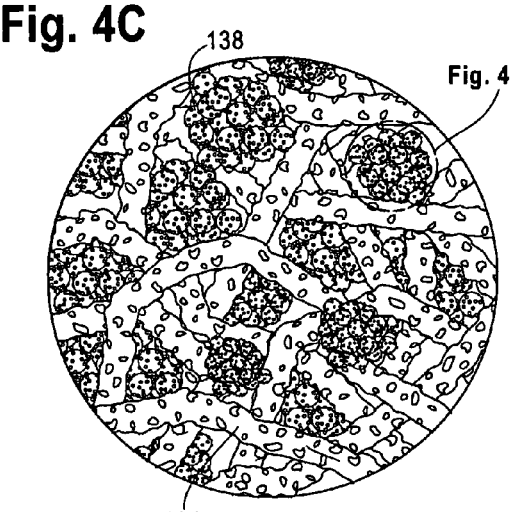
FIG. 4C is a highly-magnified view of one embodiment of the catalytic electrode surface of FIG. 4B.
Figure 4D:
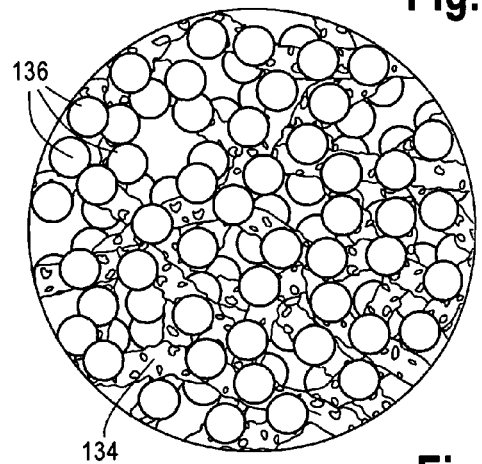
FIG. 4D is a highly-magnified view of another embodiment of the catalytic electrode surface of FIG. 4B.

FIG. 4C and FIG. 4D are further magnified views of the structures of the protuberances 132. As shown in FIG. 4C and FIG. 4D, the protuberances 132 are formed from a sparse mesh of fine filaments 134. Where used in an electrochemical cell, tungsten (W) is often preferred because it is electrically conductive, has a very high melting temperature and is both mechanically and chemically stable. Nanoporous Platinum Metals Group element and alloy foam sponges, nickel foam sponges, copper foam sponges, gold foam sponges and perovskite structure alloy sponges are also suitable for this purpose. The use of sparse mesh makes the protuberances 132 porous to fluid chemicals, such as fuels and electrolytes.

Figure 4E:
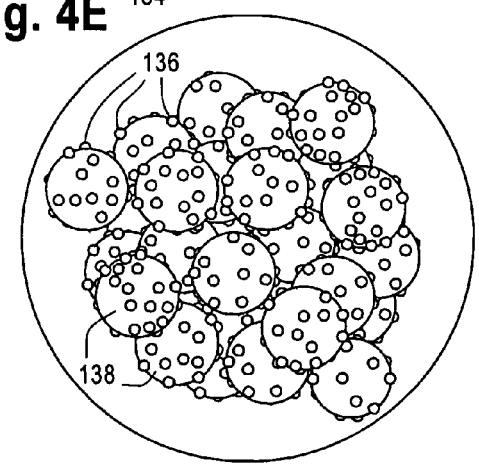
FIG. 4E is a more highly-magnified view of the catalytic electrode surface of FIG. 4C.

Referring to FIGS. 4C and 4E, there is a successive hierarchy of structures that form the protuberances 132. FIG. 4C, showing a magnification of the protuberances 132, displays the mesoporosity between aggregate clumps of Platinum Metals Group catalyst particles 136 adhered to aggregate carbon balls 138 having interstices of approximately 300 to 1000 nm. These are of sufficient width and breadth to permit moderate interstitial laminar flow of fluid through the mesopores. In addition, capillary action through the interstices contributes to the amount of electrolyte available for reaction. The degree of interstitial wetting will depend upon electrolyte viscosity and wetting angle, both of which are very high for electrolytes such as phosphoric acid and simple hydroxides.

The diameters (widths, if non-circular) of the protuberances 132 are nominally 12.5 μm. Therefore, there each protuberance 132 will contain approximately 12 to 15 aggregate carbon balls 138 across its diameter (width).

At a higher level of magnification the micro-porous structure of the aggregate 800 nm wide clusters of 40 nm diameter carbon balls 138 decorated with 2 nm width catalyst particles 136 can be identified. Typically for gas fuel or oxidizer, the catalyst bearing carbon particles 138 are held together by interstitial filamentary PTFE (not shown) to promote gas access. By comparison, a typical electrode applied to a PEM membrane that transports ions by dragging water molecules through its polymer chain interstices has a depth of about 30,000 nm (30 μm).

Normally, the carbon binder would be an acidic-soluble version of Proton Exchange Membrane (PEM) material for acidic electrolytes. For alkali electrolytes, an alkaline or merely hydrophilic polymer could be used. In either case, the diameter of the aggregate clump of roughly spherical carbon particles 138, each having a diameter of 40 nm and dotted with 2 nm catalyst particles 136, is about 800 nm. The longest or deepest shear-enhanced diffusion path for ions or other reactants to reach active catalyst surfaces is about 400 nm.

The fluid chemicals penetrating the protuberances 132 can wet catalysts, such as platinum (Pt) or its alloys containing ruthenium (Ru), palladium (Pd) or other elements from the Platinum Metals Group. In FIG. 4E, catalyst particles 136 decorate clusters of porous carbon balls 138, which are also shown in FIG. 4C attached to the filaments 134. Alternatively, catalyst particles 138 can decorate the filaments 134 (hydrophobic, if necessary), as shown in FIG. 4D.

Current advances in carbon-dispersed Platinum Metals Group catalyst technology, as shown in FIG. 4E, have reduced crystallite or grain size of the catalyst particles 136 to 2-nm and increased specific surface area of catalyst to 100-meters$^2$ per gram at current loadings of as much as 0.5 to 0.1 mg/cm$^2$ for fuel cell electrodes. In other words, it is already possible to multiply the effective catalyst area per unit area of electrode by factors of 100 to 500 and well beyond that by simply restructuring the catalytic surface layers 14 and 20.

Net catalyst loading factors can be increased by at least an order of magnitude by attaching Pt catalyst particles 136 to conventional, electrically-conducting aggregate carbon balls 138—the balls each having diameters between 20 and 50-nm. These aggregate carbon balls 138 are normally supported by mesoporous carbon structures, which are fluid permeable. Available versions of these carbon materials have a void volume of 60% after impregnation with 40% by weight of PTFE to make them wet-proof. The composite has approximately 5 to 10 nm nano-pores separating the catalyst decorated carbon spheres 138 that tend to aggregate into clumps of 400 to 800 nm across—similar to that shown in FIG. 4E. The spaces between the aggregate carbon balls 138 are also in the range of 400 to 800 nm across. These catalyst structures form the 12,500 nm (12.5 μm) diameter electrode protuberances 70, 132.

The protuberances 70, 132 provide an approximate 4-fold increase in electrode/interface area ratio. That, combined with a 250% increase in the catalyst particle 136 loading, contributes to 10-times the catalyst surface area available to electrode reactions over present practice and an expected 10-fold increase in open circuit exchange current. The actual operating current increase under load will be less due to ohmic and other losses; but, these losses can be minimized by using thicker materials.

Figure 4F:
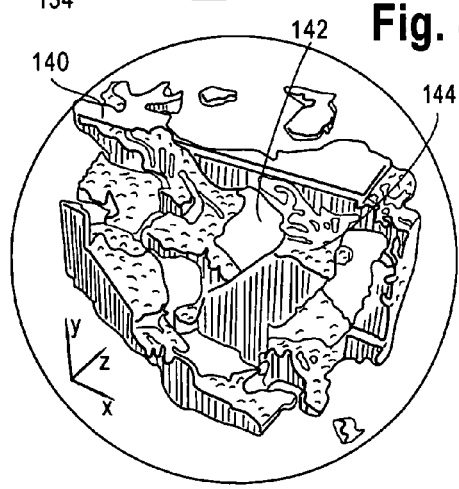
FIG. 4F is a computer-simulated view of another catalytic electrode surface.

FIG. 4F is a drawing made from a computer-simulated view of an alternative electrode fabricated from nanoporous metal foam sponge or scaffold 140, which is capable of absorbing an electrolyte. The view appeared as FIG. 4 of Pugh et al, "Formation of nanoporous platinum by selective dissolution of Cu from $Cu_{0.75}Pt_{0.25}$", J. Material Research, Vol. 18, No. 1, January 2003, pages 216-221. Coordinate vectors x, y, z are provided as a reference frame. The view covers a volume measuring 14×14×7 nm. Pugh et al used 0.28 nm pixel spacing in calculating their image, which is the atomic radius of a Pt atom. Pugh et at estimated sizes by "taking chord length measurements on the image".

Pugh et al were able to produce isotropic 3-dimensional open-pore-structure foam with 3.4 nm pores and somewhat smaller diameter scaffold struts 144 (called "ligaments" by Pugh et al). They used a process in which one element (e.g., copper) was removed from an alloy (e.g., $Cu_{0.75}Pt_{0.25}$) by selective dissolution (e.g., leeching) to yield a nanoporous metal foam sponge (140) that will absorb electrolyte.

Using the metal alloy face-centered-cubic structural geometry described by Pugh et al and by others (e.g., Erlebacher, J., "An Atomistic Description of Dealloying—Porosity Evolution, the Critical Potential and Rate-Limiting Behavior", J. Electrochemical Society, Vol. 151, No. 10, 2004, pages C614-C626); the approximate relationship of open pore fraction, $\rho_v$ to the chord length, $l_c$ and diameter, D in Pugh et al is given by:

$$(1-\rho_v)=(0.75\pi x^2+x^3)/(1+x)^3$$

where:

$$x=D/l_c, \text{ and}$$

$(D+l_c)$-nominal pore size

The higher power term cannot be ignored when D is a substantial fraction of $l_c$. The stated pore volume fraction is 0.75 based upon a starting Pt alloy concentration of 25% so that the chord diameter would calculate to approximately 2.0 nm for the smallest pore. The $D/l_c$ ratio is 0.58, which is a function of foam sponge geometry and pore volume fraction; but, does not vary for larger pore size results reported by Pugh et al. These dimensions can be increased by varying process parameters, such as de-alloying times, temperatures, applied voltages, solvents and alloy compositions. The metal foam sponge or scaffold 140 is an alternative, but similar, to the sparse metal mesh 134 of FIG. 4C and FIG. 4E.

The metal foam sponge 140 of FIG. 4F comprises a nanoporous metal scaffold 140 having open and permeable in 3-dimensions pores 142 of 5 to 15 nm contained by the scaffold struts 144, which have smaller dimensions. Metal or metal alloy or organic catalyst particles (not shown), similar to the catalyst particles 136, are attached to the scaffold struts 144 in a manner similar to that shown in FIG. 4D. The catalyst particles 136 are of about 2 to 7 nm in size for best surface area dispersion and catalyst activity. For DRFC, nickel and metals selected from the Platinum Metals Group (e.g., Pt, Ru) and their alloys are preferred catalyst materials for the particles 136 and the foam sponge scaffold 140.

Pugh et al described their metal foam pictured in their FIG. 4 as an open pore structure having 3.4 nm or larger pores 142 and comprising comparably sized Pt struts 144. Using x=0.58 and D=2 nm as calculated above, the ratio of exposed active catalyst area to projected electrode surface area is:

$$[3\pi x/(1+x)^2](T/P_D)$$

where:
$P_D$=nominal pore 142 diameter,
T=depth thickness of the electrolyte flow permeating electrode surface layers 14, 20, and
D=diameter of the nanostruts 144 forming the pores 142.

This formula reaches maximum or optimum values for open pore volumes in the range of 50 to 65%. In a 100 micron thick electrode having 75% open pore volume, 3.4 nm pores and 2.0 nm diameter struts 144, the area multiplication factor is 41,000 $cm^2$ of exposed reactive electrode surface area per $cm^2$ of projected electrode.

By comparison, the formula for an equivalent packing volume of spherical particles is $6(1-\rho_v)(T/D)$. Thus, the Pugh et al foam 140 has an exposed surface area comparable to spherical particles 136 with equivalent Pt volume loading. While supported particles 136 normally lose about half of their exposed area because of attachment requirements, the porous foam sponge struts 144 are fully exposed to reaction kinetics. Consequently, bare nanoporous foam sponge 140 is at least as effective as a catalyst dispersion mechanism as supported particles 136 of equivalent dimension; but, is a more stable structure.

A metal foam sponge 140, even with an open pore volume of 75%, is more effective for the mass transport exposure of catalyst to TVF and CCF than supported particles 136. Even with pore 142 diameters of 25 nm, the active catalyst area ratio for a 100 micron thick catalyst layer is an unprecedented 8,750 $cm^2$ to 1 $cm^2$ of projected electrode area.

For a DRFC anode, the Pt nanoporous metal foam sponges 140 can be produced from an alloy having face-centered cubic geometry with a Miller Index of (1, 1, 1) and can be loaded with Ru particles 136 made from a colloidal suspension of the appropriate salts as taught in the prior art. The foam sponges 140, containing Ru particles 136, can be heat-treated so that the particles 136 are absorbed into the Pt struts 144 to form a foam sponge of 50:50 Pt—Ru alloy. Alternatively, a 5 to 15 nm Pt porous foam sponge 140 with 50:50 Pt—Ru particles of 2 to 5 nm size can be thermally attached by heat sputtering to the struts 144. Pure Pt will work for oxygen cathodes.

These catalyst surface layers 14, 20 of nanoporous foam sponges or scaffolds 140 are excellent electrical conductors and can be deposited on or secured to micro-porous copper substrates 30, 40 that will provide substantial strength and electrical conductivity for the catalyst surface layers 14, 20. The copper substrates 30, 40 may be easily coated with a high-molecular-weight compound (e.g., PTFE) to protect the copper from corrosive attack by or premature hydrolysis of some fuels (e.g., borohydrides) and to keep the electrolyte from penetrating past the surface layers 14, 20.

The electrodes 12, 18 comprising metal foam sponge 140 catalytic surface layers 14, 20 can be operated safely in alkaline environment at elevated temperatures in the range of 250 to 350° C. and at elevated pressures to achieve accelerated catalytic performance. The same structure and process can be used to build nanoporous catalytic layers from other metal foam sponges 140, such as gold, copper, tungsten and nickel alloys or peovskite structures. These layers, attached to substrates having surface geometries to be described below in conjunction with FIG. 5B, FIG. 5D, FIG. 5E, FIG. 5F and FIG. 5G, are ideally suited to take the fullest advantage of the unique flow profiles and mass transport enhancement of catalyzed electrochemical processes in fuel cells of this invention.

The catalyst particles 136 need a fluid or an electrolyte to wet, but not flood, them in a thin envelope of fluid or electrolyte so that chemical reactants can diffuse into the molecular fluid or electrolyte coating and react at the catalyst surfaces. For direct reaction fuel cells, the boundary layer thicknesses for typical design parameters are about 0.05 mm, which are somewhat less than the thickness of proton exchange solid polymer membranes. However, one difference in current density is due to the rate of shear-amplified diffusion in a TVF cell compared to polymer interstitial transport. Typical laminar boundary layer shear rate accelerated diffusion in a DRFC with TVF is as much as 15 to 20 times the nominal flow rate in a proton exchange membrane fuel cell (PEMFC).

The electrode protuberances 132 should extend about half, to at most three quarters, of the way into the high-shear-rate laminar CCF layer 56; but, not into the TVF 54 where the protuberances 132 would be subjected to excessive viscous drag and possible damage or deterioration. The laminar CCF layer 56 is less than 0.050 mm. thick. Therefore, the protuberances 132 should be approximately 0.025 to 0.038 mm in height.

Simple plane geometric calculations provide values for a) the fraction of electrode surface, f, covered by protuberances and b) the projected area ratio, m, of actual catalyst surface area to projected surface area.

Figure 5A:
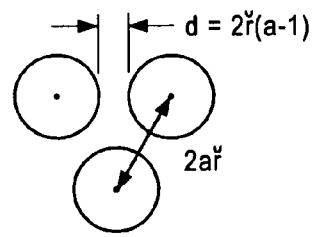
FIG. 5A is a cross-sectional view from the top of hexagonal close-packed (HCP) catalytic electrode protuberances similar to protuberances shown in FIG. 4B where the protuberance are not in contact and their centers are separated by a distance of 2ař.

If the radii of idealized cylindrically-shaped protuberances 132 are equal to ř and the protuberances 132 are arranged in a HCP array with centers spaced 2.5ř apart, as shown in FIG. 5A, then they will cover very close to half the catalyst projected surface area so that f=50%.

Figure 5B:
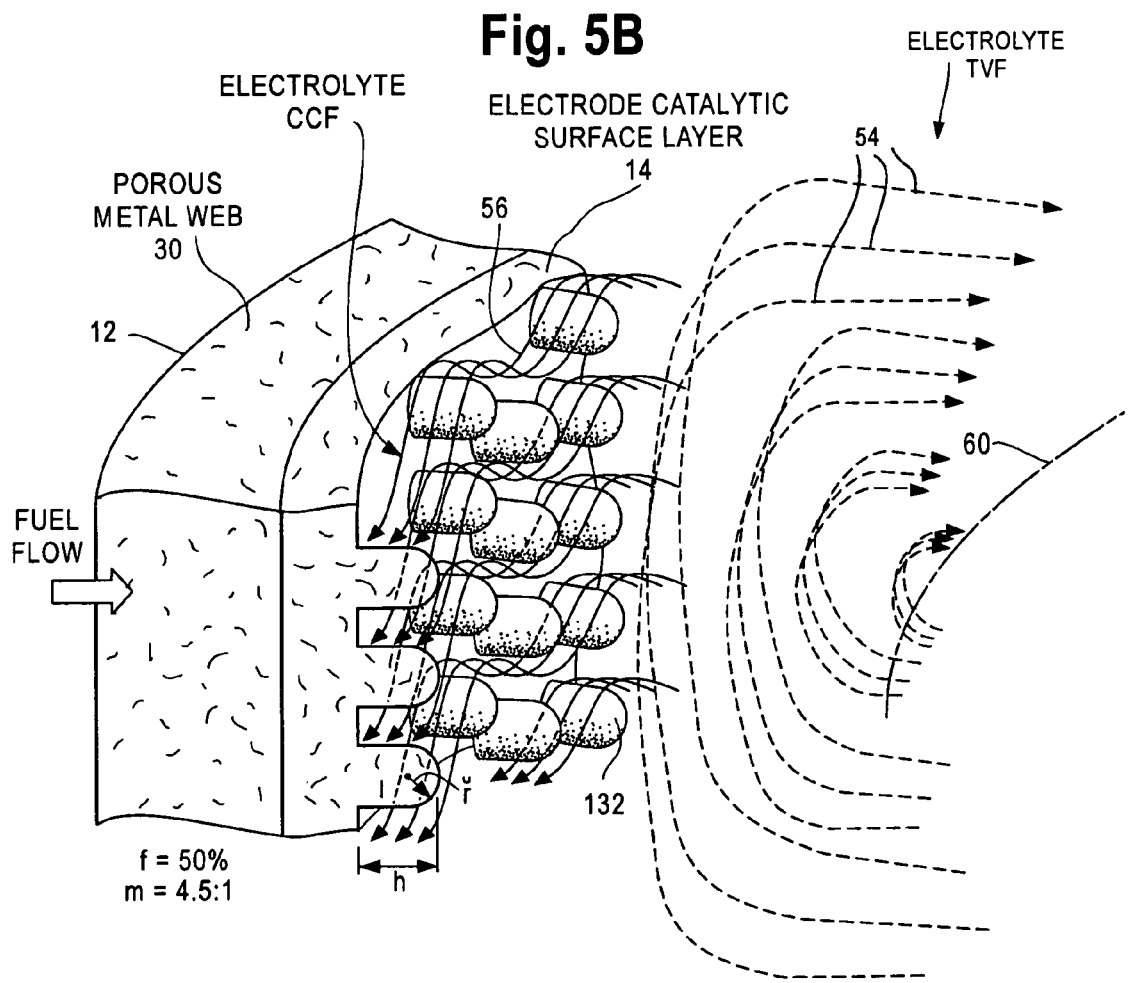
FIG. 5B is a cross-sectional view from a side of HCP catalyst electrode protuberances of FIG. 5A where they comprise cylinders of height h topped by hemispheres of radii ř that extend into CCF generated by TVF.

The surface area of a protuberance 132 is approximated by a hemispherical cap of area, $2\pi ř^2$ plus a supporting cylinder of area, $2\pi řh$ where h is the height of the projection. If the height, h, of each cylindrical portion is between 2ř to 4ř and is capped by a hemispherical dome of radius, ř, as shown in FIG. 5B, then the total external surface area of the protuberance is in the range of $6\pi ř^2$ to $10\pi ř^2$. Because the area of the portion of surface covered by a protuberance is $\pi ř^2$, the projected area ratio is 6 to 10 times f and the ratio of actual electrode surface area to projected area or area multiplier, m, is 3.5 to 5.5 for an average projected area of m=4.5:1.

FIG. 5B provides another view of the relationship between the TVF 54 rotating around the TVF axis 60 and the CCF 56. The CCF 56 are orthogonal to the TVF 54 and parallel to the TVF axis 60. The CCF 56 encompass protuberances 132 that extend from the electrode catalytic surface layer 14 into the CCF 56. A similar relationship is formed at the convex cylinder 18 (not shown in FIG. 5B).

Figure 5C:
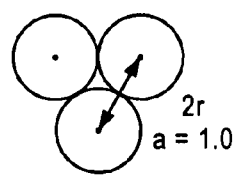
FIG. 5C is a cross-sectional view from the top of HCP catalytic electrode protuberances similar to protuberances shown in FIG. 4B where the protuberances are in contact.
Figure 5D:
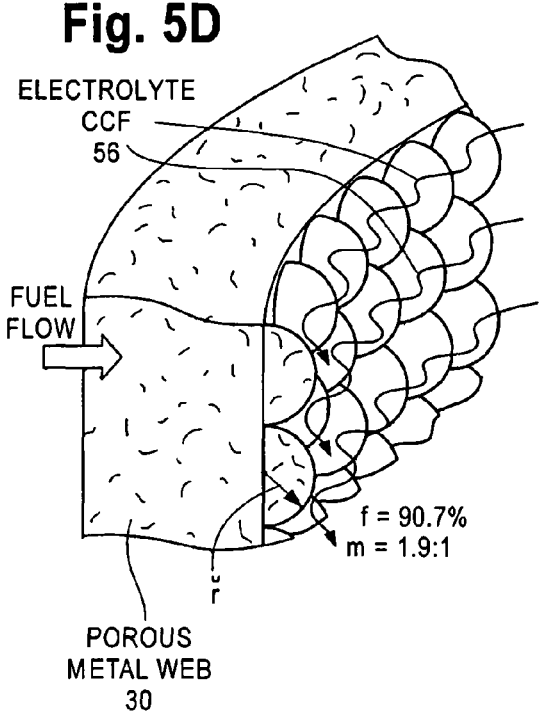
FIG. 5D is a perspective view of HCP catalytic electrode protuberances of FIG. 5C where they comprise hemispheres of radii ř that extend into CCF.

FIG. 5C shows a HCP array where circles of radius ř are in contact and the gap between circles is zero. f=90.7% of the catalyst surface area. FIG. 5D shows an example where the protuberances are only hemisphere caps of radius ř embossed on the catalyst surface. These protuberances 132 have an effective surface area of $2\pi ř^2$ covering an area of $\pi ř^2$ for a ratio of 2:1 to 1. Therefore, 90.7% of the cylinder 30 area has a weighting factor of 2.0 and 9.3% of the cylinder 130 area has a weighting of 1.0. The total net nominal area multiplier m=1.9:1.

Figure 5E:
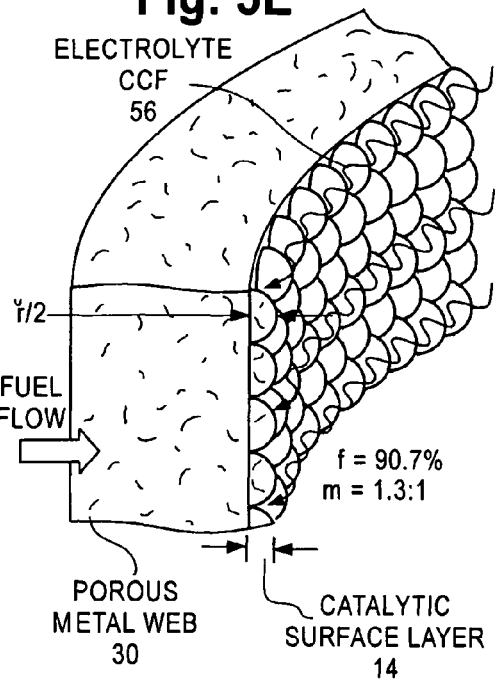
FIG. 5E is a perspective view of HCP catalytic electrode protuberances of FIG. 5C where they comprise partial hemispheres of radii ř and height ř/2 that extend into CCF.

Even if the caps of the protuberances 132 were only a portion of a hemisphere, e.g., half height or ř/2 as shown in FIG. 5E, 90.7% of the projected area would have a multiplier of 1.33 for a net multiplier of 1.3, which would represent a reasonable approximation for the minimum area multiplying effect of the projected geometry.

Whatever geometry of the protuberances 132 that may be selected within the range of this general description, it is intended that the total height, (h+ř) of the protuberances 132 be somewhat less than the thickness of a CCF boundary layer 56 of FIG. 2C.

Using this somewhat idealized geometry of the protuberances 132, where their centers are separated by a distance of 2ař, in the laminar CCF 58, the area multiplier, m, is:

$$m = 1 + (\pi/2a^2\sqrt{3})[(2h/ř)+1]:1$$

The choice of protuberance parameters will depend upon the reactants and catalyst being used in conjunction with CCF 56.

Figure 5F:
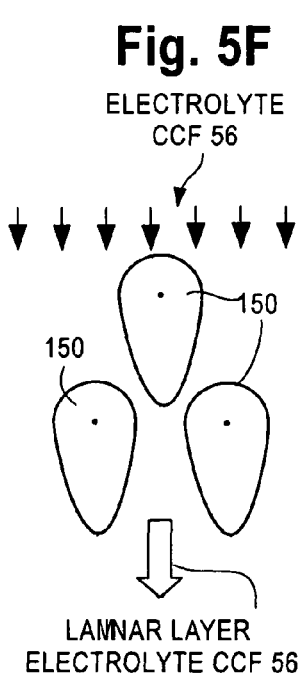
FIG. 5F is a cross-sectional from the top view of catalytic electrode protuberances that have streamlined profiles that reduce turbulence.

The protuberances 132 preferably may have a streamlined shape, as shown for protuberances 150 of FIG. 5F, for insertion into the laminar CCF boundary layer 56 of TVF 54. Some prior art catalytic surfaces incorporate turbulent-producing projections that are designed purposely to promote chemical mixing for electrochemical processes and voltammetry. By contrast, the chemical process accelerator systems of this invention avoid turbulence and preserve laminar flow in the catalyzed reaction zone to be effective as a mass transport mechanism conveying reactants to and from actual catalytic surfaces. Also, the protuberances 132 and 150 should present high active surface areas to the laminar CCF 56 per unit area of projected electrode in relation to the reaction zone depth.

In a typical and practical example for a DRFC, the catalyzed reaction zone could have a depth of several microns and the laminar CCF boundary layer 56 would be somewhat in excess of 25 microns. With a net height of about 4-times the radius as in the just calculated example, the protuberances could have diameters of about 12.5 microns and are spaced on centers 15.625 µm apart. The electrode surface would have the appearance and smooth feel of 1000 to 1500 grit abrasive paper of the sort used to polish stone.

When fuel or oxidizer is converted by catalyst to a final molecule or ion in only one or two intermediate steps, it is generally adequate to use only one type of catalyst that is most ideally suited to the reaction in question. These reactions proceed to completion more quickly than those requiring multiple intermediate steps. In these cases, the electrode surface can have geometry similar to FIG. 5B with a projected area multiplier on the order of 4.5:1, as calculated above.

As shown in FIG. 5B, FIG. 5D, FIG. 5E and FIG. 5F, both fuel and oxidizer in a fuel cell pass through their respective electrodes in a cross-flow relationship without mass transport limitation and with sufficient residence time to complete their respective reactions. Neither is possible in PEMFC of the prior art. These cross-flows are orthogonal to high-shear-rate electrolyte CCF that both promote reaction rates and assist in moving undesirable products into TVF for elimination from the reactor or cell.

Figure 5G:
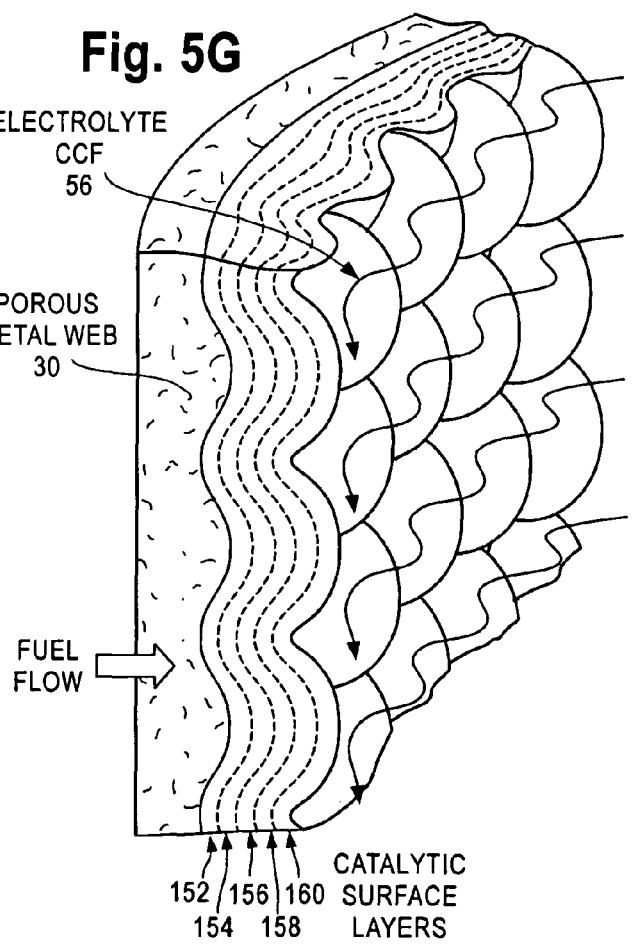
FIG. 5G is a perspective view of catalytic electrode protuberances composed of multiple catalyst layers.

Chemical process accelerator systems taught here also improve the overall rate of slower reactions that produce multiple intermediate products prior to completion, such as the oxidation of methanol and other alcohols. FIG. 5G shows a catalyst comprising multiple layers of different types of catalyst materials. These tailored reaction zones are schematically depicted as catalyst layers 152, 154, 156, 158 and 160. Each of the layers has a thickness sufficient to provide necessary residence time for an intermediate reaction to complete before the intermediate product converts to a subsequent intermediate or final product.

It is well known that a particular morphology and composition of a catalyst can be better suited to one intermediate reaction step than other reactions. Therefore, multiple catalyst layers 152, 154, 156, 158 and 160 having each layer optimized for one or two intermediate reactions reduces or eliminates the need for engineering tradeoffs demanded by homogeneous catalyst structures and permits optimization for specific reactions.

Finally, electrodes that have been disclosed for use in DRFC generating TVF and CCF do not require any membrane and can operate at substantially elevated temperature and pressure (i.e., fuel concentration). This further increases catalyst activity to achieve increased reaction rates at higher voltages and current densities.

To summarize, several benefits of chemical process accelerator systems incorporating TVF-induced high-shear-rate laminar CCF at catalyst surface layers include:

Bi-directional mass transport of constituents to and from catalyst surface layers by cross-flow of reactants (e.g., fuel, oxidizer) directly through catalyst structures wetted by TVF-induced high-shear-rate laminar flows, Control of the residence time of reactants in catalyst surface layers to permit very complete reactions, Substantially increased catalyst loading factor and useful catalyzed reaction zone thickness to permit higher area current densities, Layered catalyst compositions and morphologies in coordination with cross-flow fuel/oxidizer transport best suited to the specific intermediate reaction occurring in the zone, Operation of catalysts at higher temperatures, gas pressures and fuel concentrations without significant crossover due to more complete fuel/oxidizer utilization than would be possible with PEM and other crossover barriers, Use of potentially less-expensive active catalyst, and Selection from a wider range of acidic or alkaline fluids capable of sustaining TVF.

These and other advantages will be seen in specific embodiments as further described.

For a DRFC consuming methanol as its fuel—a DMFC, methanol requires as many as five oxidation steps before it reaches its final composition of $H_2O$ and $CO_2$. The theoretical maximum power and voltage that can be obtained from oxidizing this fuel without irreversible losses is 700 kJ/mol and 1.21 volt at STP. However, catalysts having no rather substantial irreversible energy losses with respect to all five steps and operating at near STP conditions in acidic electrolyte do not yet exist.

Current typical Pt/Ru catalysts require 0.35 to 0.5 volt of irreversible energy (heat producing) overvoltage to promote all 5 steps of the requisite reaction. Consequently, it has not been possible to gain more than 400 to 500 kJ/mol from direct methanol oxidation or an open circuit voltage (OCV) of greater than 0.7 to 0.85 volt. Further, methanol that is not fully oxidized in DMFC will pass freely through PEM and cause additional losses.

Ren, et al, "Recent advances in direct methanol fuel cells at Los Alamos National Laboratory", (Journal of Power Sources 86 (2000) 111-116), reported at Page 113 that 'methanol crossover has been considered a severe barrier to faster development of DMFC technology." They wrote:

The former tool is obvious: with lowering of methanol feed concentration, the rate of crossover drops at zero cell current. The latter tool is more subtle: by using appropriate cell design, a significant drop in methanol crossover can be achieved with increase in cell current, i.e., with increase in rate of anodic consumption of methanol."

In stark contrast to the Ren et al dual expedients of spreading the reaction over a large area to accommodate slow mass transport and lowering the fuel concentration—both of which are needed to accommodate slow catalyst activity and to assure near-total methanol oxidation to mitigate fuel crossover, chemical process accelerator systems of this invention have much higher mass transport rates to and from catalyst surface layers to achieve much higher anode reaction rates and fuel concentrations to oxidize methanol and to remove unreacted methanol from cells before there can be any crossover to cell cathodes.

The best Ren et al result reported >90% fuel utilization and an implied crossover of the remainder through PEM with an overall methanol-to-dc conversion efficiency of 37%. Methanol concentration was 0.0005 mol/ml and the polarization relationship (vs. SHE) was 0.18 (Amp) $A/cm^2$ at 0.45 volt with an implied hypothetical OCV of 0.7 volt and power density of 0.081 watt/$cm^2$ of projected electrode area. These data are useful as estimates of the activity or reaction rate of typical Pt/Ru catalyst surfaces at 333° K for methanol in an acidic environment where reactions are so spread out and dilute that they may be much less subject to mass transport limitations. For example, it is clear from the Ren et al data that each square centimeter of their electrode is fully processing $1.7 \times 10^{17}$ molecules of methanol per second with at least 5 intermediate chemical steps required to reach the $CO_2$ endpoint.

The carbon supported catalyst particles at the anode were 50:50% atm. Pt/Ru of 3.5 nm average diameter or a surface area of $3.85 \times 10^{43}$ $cm^2$ about half of which actually participates in the reaction yielding an active area of about 1924 $Å^2$ (Angstrom$^2$) per catalyst particle. The mean particle density of 17 gm/ml corresponds to a net $3.8 \times 10^{19}$ gm per particle yielding $2.62 \times 10^{15}$ particles/mg. A 1.0 mg/$cm^2$ electrode loading factor means that each particle is fully 5-fold processing 65 molecules of methanol per second. Therefore, the reaction rate per chemical step must be approximately 3 milliseconds.

At a loading factor of 1.0 mg/$cm^2$ there are 1000 $cm^2$ of catalyst surface for each $cm^2$ of electrode surface, with half of that being available to the reaction. Consequently, the rate metric that can be extracted from the Ren et al data are a catalyst surface current density of 360 $\mu A/cm^2$ and 162 $\mu W/cm^2$. When the catalyst is successfully processing 93% of the methanol molecules coming to its surface, each molecule is converting its gross free energy at an efficiency of 41% because of overvoltage and other losses. Thus, 41% of 93% yields a net efficiency of 37%. The computed rate is about 300-times slower than the characteristically slow ORR and 20-times slower than the alkaline model reported in the prior art. This is due to the exceptionally dilute fuel required to prevent crossover and the mass transport interference of opposing flows of fuel feed and escaping $CO_2$ within the anode.

At the methanol dilution and efficiencies described by Ren et al, the available free energy of the fuel is equal to 130 J/ml moving at a velocity of 8.1 nM/sec. to the catalyst surface where there are 65 methanol molecules/sec being fully processed 5 times by each particle. This represents the time required for intermediate specie to move locally to a catalyst surface against a reverse and opposing flow of acid solution carrying $CO_2$, which is a final product that must escape from the fuel cell through the fuel feed stream.

Clearly, the computed reaction metric is a worst-case reaction rate for very dilute 60° C. methanol on Pt/Ru catalysts. Scott, K. et al, "Electrocatalysis in the Direct Methanol Alkaline Fuel Cell" (Liu. H et al, editors, *Electrocatalysis of Direct Methanol Fuel Cells*, Wiley-VCH, 2009) report at Page 492:

Oxidation kinetics were much better in alkaline than in acid solution; factors of 30 for Pt and 20 for $Pt_2Ru_3$ at 0.5V at 333K It is difficult to estimate what part of the 3 millisecond reaction time is due to the PEM mass transport environment in which the reaction product has to make way for fuel trying to diffuse into the anode; but, at least it is possible to estimate that the reaction time would likely be less than 0.15 milliseconds in alkaline solvent.

A comparison of the Ren et al DMFC with a DMFC of this invention raises a question about requirements for a catalyst surface layer to be used with concentrated methanol at substantially higher temperature being forced through a catalytic anode into TVF that sweeps away $CO_2$ gas or carbonate ion plus water formed at the anode. In this case, constituent mass transport is fully assisted by the several flows working in a reaction-promoting direction. However, just as it was not possible to extract the mass transport component from the previous calculation, it will not be taken into account in this one—other than to assume it is at least equally negligible.

Attention is mainly focused on reasonable catalyst site reaction rate parameters. These will be compared to prior art activation overvoltages in relation to exchange or 'activation' current, $j_0$ in two cells using TVF in alkaline electrolytes.

The thermodynamic Nernst equation can be used to compute increases in free energy due to higher methanol concentrations, temperatures and pressures:

$$\Delta g_f = \Delta g_f^\circ - RT \ln(\alpha_m \cdot [\alpha_{O2}]^{3/2}/\alpha_{CO2} \cdot [\alpha_W]^2) + T\Delta S$$

where:
- $\alpha_x$ refers to an activity parameter given by a ratio of elevated partial pressure or concentration in the reaction over the value at STP,
- subscripts, m and w refer to methanol and water, respectively,
- $\Delta S$ is an entropy change mainly associated with a constituent phase change of either sign, and
- $\Delta g$, the Gibbs energies, <0.

Dividing through the previous equation by 6F, to account for the 6 electrons in the reaction, yields:

$$E = E^\circ + (RT/6F) \ln(\alpha_m \cdot [\alpha_{O2}]^{3/2}/\alpha_{CO2} \cdot [\alpha_W]^2) - T\Delta S/6F$$

This equation describes an increase in voltage with temperature and activity of the reactants where $E^\circ$ is 1.21 volts.

The principal contribution to the voltage increment in this case is due to the higher pressure of 95% $O_2$; but, the effect is small, with E≈1.25 volts. A far more significant effect is the influence of temperature and fuel/oxidizer concentration on the rate parameter, $j_0$ and the concomitant decrease in overvoltage or the OCV relative to E. In the Ren et al example, above, an OCV of 0.7 volt reveals a minimum 0.5 volt of irreversible loss.

Applying the Tafel equation:

$$j = j_0 \exp(6\alpha F[\Delta V]/RT)$$

where:
- $\alpha$ is the charge transfer coefficient; usually assigned a value of 0.5) to those values would not provide further insight into that experiment as other losses clearly override any further information it would normally yield.

On the other hand, the overvoltage at a temperature of 533° K will fall to about 0.15 volt as suggested in the prior art. Subtracting a $\Delta V$ of 0.1 volt in the Tafel equation result from the OCV leaves 1.0 volt across the DMFC. The value of $j_0$ can be a reasonable 10 milliamp, which can be easily adjusted by increasing the catalyst loading factor to as high as 1.0 milligram of $Pt_2Ru_3$ per reaction processing zone, as described above. Applying these values to the Tafel equation yields a net current density of 10 A/cm$^2$.

Assuming the process just described converts 90% of the fuel feed by means similar to that described by Ren et al., then the net yield with respect to reversible free energy will be 522 kJ/mol. If methanol is forced through an anode at approximately one-half concentration of 12.5 mol/liter in a solution of KOH and the target power density is 10 watts/cm$^2$, then, at 10,075 joules per ml of flowing power density the velocity of the methanol fuel within the reaction zone, if it is converted at the stated efficiency, must be approximately 10 microns/sec.

If there are five layers of individually tailored catalyst and the reaction zone is 50 microns thick, then each of the five intermediate reactions has one second for completion. Such residence times are likely to be adequate. In an acid electrolyte such as $H_3PO_4$, the fuel concentration is closer to 25 mol/liter and the individual reactions would have nearly 2 seconds to complete, which is helpful as reactions are slower in acid.

The prior art overcomes mass transport limitations by spreading the reactions over large areas. DMFC of this invention can achieve 10 watts/cm$^2$ or 10 amps/cm$^2$ at 1.0 volt by using alkaline electrolyte. A kilowatt DMFC of this invention requires 100 cm$^2$ of electrode surface area. By comparison a conventional DMFC with a similar total power rating and the same net fuel conversion efficiency would require 2000 cm$^2$ anode at 0.5 watt/cm$^2$, which is typical in current practice.

To put this in perspective, an electrode in the high power density example above must process methanol fuel at the rate of $1.9157 \times 10^{-5}$ mol/cm$^2$-sec. of projected electrode. Using the catalyst parameters earlier calculated and the m=1.9 area projection factor for one of the electrode surface layer designs described above and a porous electrode loading factor of 5.0 milligram/cm$^2$ divided among the 5 zones with 50% of the catalyst surface layer participating in the reaction, there are 4,750 cm$^2$ of catalyst surface area for every cm$^2$ of electrode area.

Consequently, the average catalyst-surface layer current density for a DMFC of this invention is a reasonable 2.1 milliamp mA/cm$^2$. The gross methanol molecular processing rate is $4.03 \times 10^{-9}$ mol/cm$^2$-sec. Because the process requires five intermediate steps, the mean specific molecular processing rate increases by a similar factor.

With the average catalyst particle having an effective processing area of $2 \times 10^{-13}$ cm$^2$ or 2000 Å$^2$ (Angstrom), the fuel requirement is $8 \times 10^{-22}$ total methanol-mol/particle or about 5 times 482≈2,410 molecules of methanol species intermediate per catalyst particle per second. That means, even though the fuel has several seconds to undergo reaction processing in the electrode reaction zone, the constituent molecules must approach the catalyst particle surface layer, react and leave that surface layer in about 4 milliseconds provided the catalyst particle can process at least 10 molecules simultaneously or 1 molecule per 200 Å$^2$. This result is virtually identical to the previous calculation using actual data reported by Ren et al.

It would not be unreasonable to suggest that the exceptional mass transport characteristics of the high-power alkaline DMFC of this invention could function with less catalyst at higher catalyst activity levels. Such high levels of mass transport rate can only be achieved by the TVF-induced high-shear-rate CCF of this invention and can be further enhanced by 1) somewhat reducing particle size for increased particle number, 2) increasing particle loading by weight, 3) operating at higher temperature or 4) any combination of the preceding.

In order to increase fuel efficiently using PEM in a DMFC, the electrode area must be increased until mass transport no longer limits the molecular reaction rate in the catalyst surface layer. Spreading the catalyst particles over a much larger area proportionately increases their number, their cost and the time available for molecular exchange. This is the only available option that limitations of relevant mass transport in the PEM prior art permit. It is worth noting that for a power density of 0.081 watt/cm$^2$, the Ren et al DMFC requires 617 cm$^2$ of electrode area for 50 watts and 617 milligrams of catalyst at the anode. Despite the higher catalyst load factor the high-power DMFC of this invention only needs 5 cm$^2$ and 25 milligrams for the same power.

Chemical process accelerator systems of this invention also improve oxygen reduction reaction ("ORR") at fuel cell cathodes. ORR is known to be a major limiting factor in the power density of current state of the art hydrogen/oxygen fuel cells. Actual operating systems generally yield less than 1.0 Amp/cm$^2$ at power levels less than 0.5 watt/cm$^2$. If a theoretical single platinum crystal surface is exposed to ORR chemistry without any mass transport limitation and the current and power densities per cathode size are expressed in per unit area of catalyst surface, then ORR of this invention will be much higher than obtainable with prior art electrodes.

The prior art analysis of ORR is based of quantum density functional theory (DFT), which is a computer simulation model for forecasting with several rate limiting intermediate steps in the ORR that reacts adsorbed oxygen into adsorbed water. If the cathode catalyst were perfect, then every intermediate step would move the cathode potential down to its theoretical minimum of −1.23 volts. For a less than perfect catalyst, some of the intermediate steps are uphill thereby adding to the theoretical minimum. In fact, the calculated energy levels yield −0.78 volts at maximum current per unit area of active catalyst surface, scalable as a function of applied voltage.

The parameters are referred to in the prior art as $j_{limit}$, where $eU_0$ and $U^{max}_{ORR}$ are the maximum theoretical energy for a perfect catalyst at −1.23 volts and the actual maximum energy at −0.78 volts, respectively. The Tafel equation provides a relationship between the hidden exchange current density, $j_0$ at open circuit and $j_{limit}$, which can be measured and is reported to be 96 mA/cm². Using a voltage difference of −1.23+0.78=−0.45 and a typical electron transfer coefficient of 0.5, then $j_0$ is calculated to be about $2.64 \times 10^{-9}$ Amp/cm². This is understood to be the open circuit exchange current density at the active portion of catalyst surface at standard temperature.

The Butler-Vollmer version of the Tafel equation provides:

$$j=j_0 \exp(2\alpha F[\Delta V]/RT)$$

where:
F=the Faraday constant, 96,485 coulombs/mole, and
R=the universal gas constant=8.314 joules per degree per mole.

What is quite remarkable is that even though the exchange current density is very low, as soon as a ΔV operating voltage drop from the open circuit value is applied, generally about 0.45 volt; the current density increases to 0.1 Amp/cm², which is understood to be the current density at the active portion of catalyst surface. This theoretically computed value assumes that there is no mass transport rate limitation.

Finely divided and dispersed 2 to 5 nm Pt has a gross surface area of 100 M²/gm. With only 20% of the area active to produce electrical current (or 20 cm² of catalyst surface per 1.0 cm² of electrode surface), a 20:1 current density multiplier can be obtained with a Pt catalyst loading factor of 0.1 milligram/cm² or a 100-times improvement with only 0.5 milligram/cm² of platinum.

In this example, an ORR cathode would produce 10 Amp/cm² (assuming no mass transport rate limitation to or from the catalyst surface layer), which is understood to be more resistant to good fuel cell performance than the hydrogen anode. In short, there is no fundamental reason or law of nature that requires electrode current densities to be limited to 1.0 Amp/cm² at reasonable voltages and power densities other than present catalyst designs and mass transport retardation built into current fuel cells. The chemical process accelerator systems of this invention solve these problems.

DRFC Battery

The DRFC 10 that has been described with electrodes capable of generating 10 Amperes/cm², will deliver 1,000 Amperes of current from a rotating anode electrode catalytic surface layer 20 measuring about 19 mm in diameter by 90 mm long. The voltage under load across terminals 46 and 48 will be about 0.8 to 1.0 volt.

There are two problems that need to be considered when using high-current DRFC 10. The first is how to obtain a voltage that will meet requirements of the external electrical circuit load 50. The second is how to solve problems created by the collector ring 42 and the collector brush 44 that are used to provide a circuit between the rotating electrode 18 and the external electrical circuit load. One solution will solve both problems.

It is obvious to connect a plurality of individual cells in series by sequential connection of the anode of one cell to the cathode of another cell to form a battery or stack having a desired output voltage. This technique will not produce a satisfactory result for DRFC 10 or any other fuel cell that contains a collector ring (e.g., 42) or a collector brush (e.g., 44) because of three problems caused by these elements.

The first problem is that efficient collector rings are made from copper alloys, which are susceptible to attack and corrosion by electrolyte chemicals. Although not shown in FIG. 1A, the collector ring 42 requires seals to protect it from exposure to both the electrolyte and the fuel—both of which can increase its surface electrical resistance where the collector brush 44 contacts it.

The second problem is that a collector brush 44 capable of carrying a 1,000 Ampere current load is physically large—especially when compared to the 19 mm diameter of the rotating cylinder 18. Such a brush will have a face area that is greater than that of a 19 mm diameter cylinder and would require a substantially larger collector ring 42. Therefore, the size of the collector brush 44 becomes a limiting factor on the electric current capacity of the cell.

The third problem is that there is a voltage drop across the collector ring 42 and the collector brush 44 of about 0.1 volt under load, which is about 11% of the load voltage. This loss is attributable to contact interface loss of a carbon brush running against a copper alloy ring and to $I^2R$ losses in the carbon brush assembly.

For these three reasons, it is not practical to simply connect in series DRFC or other fuel cells with a rotating electrode to form a battery. However, practical fuel cell (including DRFC) batteries can be built, as shown in FIG. 6.

A fuel cell battery 200, which may be a DRFC battery or stack, comprises four fuel cells CELL A—202A, CELL B—202B, CELL B—202C and CELL D—202D that may be similar to the DRFC 10 shown in FIG. 1. Each cell contains a rotating electrode 204x where x stands for one of the letters A, B, C or D that is associated with one of the four cells 202x. The electrodes 204x are fixed to a rotating shaft 206 that is driven by an electric motor (similar to motor 52) that is not shown in FIG. 6. Each cell also contains a fixed electrode 208x that is secured to frame 210x. Each frame 210x is electrically insulated from adjacent frame(s) 210x.

Each of the cells 202x has a rotating electrode manifold 212x and a fixed electrode manifold 214x, Fuel duct 216 in rotating shaft 206 connects a source of fuel (not shown) to rotating electrode manifolds 212A and 212C. Similarly, oxidizer duct 218 in rotating shaft 206 connects a source of oxidizer (not shown) to rotating electrode manifolds 212B and 212D. The oxidizer is shown in FIG. 6 as $O_2$; however, it can be any suitable oxidizer.

The fixed electrode manifolds 214x are equipped with input ports 220x. Fixed electrode manifold input ports 220A and 220C connect to a source of oxidizer (not shown). Fixed electrode manifold input ports 220C and 220D connect to a source of fuel (not shown).

Rotating electrodes 204A and 204C are anodes. Rotating electrodes 204B and 204D are cathodes. Fixed electrodes 208A and 208C are cathodes. Fixed electrodes 208B and 208D are anodes.

As for the DRFC 10 of FIG. 1A, this fuel cell 200 is operated by rotating the shaft 206 and injecting fuel through duct 216, port 220A and port 220D while also injecting oxidizer through duct 218, port 220B and port 220D. TVF 222 and CCF (not shown) then form in electrolyte chambers 224$x$ in electrolyte recycled through electrolyte balance of plant (BOP) 226, as shown in FIG. 6.

An electric circuit—illustrated in part as dashed line 230—is then formed that starts at battery cathode $e^+$ terminal 228 that is electrically connected to fixed electrode 208A. The circuit follows near dotted line 230 up fixed electrode 220A, across electrolyte chamber 224A, up rotating electrode 204A to copper alloy sleeve busbar 232AB that provides a low-electrical-impedance connection between anode rotating electrode 204A and cathode rotating electrode 204B. The busbar 232AB is secured to and electrically insulated from the rotating shaft 206. The busbar 232AB is also insulated (not shown) from electrolyte in chamber 224A and 224B to protect it from chemical attack.

The electric circuit continues up rotating electrode 206B, across electrolyte chamber 224B and up fixed anode electrode 208B to copper alloy busbar 234BC, which is secured to and insulated from frames 210B and 210C. The busbar 234BC provides a low-electrical-impedance connection between anode fixed electrode 208B and cathode fixed electrode 208C. The electric circuit continues up electrode 208C, across electrolyte chamber 224C to rotating anode electrode 204C and to busbar sleeve 232CD, which is essentially identical to busbar sleeve 232AB. The busbar sleeve 232CD provides a low-electrical-impedance connection between anode rotating electrode 204C and cathode rotating electrode 204D.

The electric circuit then continues up rotating cathode electrode 204D, across electrolyte chamber 224D and up to fixed anode electrode 208D to battery anode $e^-$ terminal 236. The circuit is completed by electrical conductors 238 that connect the battery terminals 228 and 236 to external electrical circuit load 240.

The arrows adjacent the dashed line 230 show the direction of electricity in the electrodes 204$x$, 208$x$. Only ions, not electrons, flow across the electrolyte chambers 224$x$ which may be modeled as voltage sources. The arrows adjacent the electrical conductors 238 show the direction of electric current flow in the external electrical load 240.

FIG. 6 illustrates a four-cell battery in order to show the fixed busbar 234BC. However, the minimum number of cells required for the fuel cell battery 200 not requiring collector rings or brushes (e.g., 42, 44) is only two. Where only two cells are used (e.g., 202A and 202B), then an anode terminal similar to anode terminal 236 can be used in place of the fixed busbar 234BC.

An important point worthy of emphasis is that this novel fuel cell battery 200 does not contain any collector ring or brush. Thus, there is no need for 1) shaft seals or other mechanisms to protect a collector ring or brush from chemical attack, 2) additional cells or batteries connected in parallel to provide extra current to compensate for a current-limiting collector ring and brush, or 3) additional cell(s) connected in series to provide extra voltage to compensate for contact interface and $I^2R$ losses in a collector ring-carbon brush assembly. This collector brush-free fuel cell 200 battery configuration makes use of high-current fuels cells, such as the DRFC 10 practical for powering high-energy external electrical circuit loads 240. Further, it can be built with as many cell pairs as needed to obtain a desired terminal 228-236 voltage.

Acid-Electrolyte DRFC Fueled by Methanol

DRFC fueled by methanol and using an acid electrolyte are called Direct Methanol Fuel Cells (DMFC). The best electrolyte for DMFC is concentrated phosphoric acid, $H_3PO_4$ that melts at 40° C.; however, it requires heating at start up.

DMFC have two advantages in mobile applications, such as transportation. First, they can achieve almost complete direct oxidation of $CH_3OH$ to produce only $CO_2$ and $H_2O$ that are easily exhausted to the atmosphere during TVF electrolyte recirculation. Second, they can operate at a temperature less than 100° C. However, operation at 250 to 350° C. will convert 100%-concentration liquid methanol and ethanol at any pressure to a gas and potentially accelerate the activity of cheap catalysts.

Further, there is no need in DMFC of this invention to dilute methanol to prevent fuel crossover because there is near-total fuel consumption before reaction products reach the electrode-electrolyte interface. Internal pressure greater than 2.7 bar (40 psi) will assure that the fuel remains in concentrated liquid form at 100° C. within the fuel cell. In such case the lack of a gas phase that must cooperate with the liquid electrolyte in the catalyst surface layer can be an advantage—although this feature is largely mooted by the TVF in DRFC of this invention.

The chief disadvantage of DMFC is slow reaction times for complete oxidation—even with expensive Pt/Ru catalysts. Anodes constructed as described above and in Case C have effective reaction zone depths that will compensate for inherent reaction delay; but, catalyst cost may not favor DMFC in a particular application.

Direct reaction of hydrocarbon fuels such as methanol, ethanol, methane and propane in acidic electrolyte can be substantially accelerated with much less expensive catalysts (e.g., Ni alloy) when higher temperatures and pressures are employed within the fuel cell. Above 250° C., both methanol and ethanol will enter the DRFC as a gas, even though they may be stored in liquid form. Although it would take pressures in excess of 6.7 bar (1000 psi) to obtain comparable volumetric molar concentrations of these fuels as stored in their liquid form, the volumetric disadvantage is more than offset by the accelerated reaction rates using nanostructured catalysts such as Cu-based cermets or Ni/ceria-doped zirconium on Cu nanoporous supports. Pt also is an economic option at lower loading factors.

Acid DMFC, even at an elevated temperature, are medium temperature fuel cells as contrasted with a low temperature polymer exchange membrane (PEM) or high temperature solid oxide fuel cells (SOFC). DMFC have many of the advantages of high temperature solid oxide fuel cells (SOFC) and none of the disadvantages of low temperature polymer exchange membrane (PEM) fuel cells.

Alkali-Electrolyte DRFC Fueled by Methanol

DRFC fueled by methanol and using an alkaline electrolyte are called Direct Methanol Alkaline Fuel Cells (DMAFC). DMAFC use hydroxyl ion electrolytes containing a cation from Group 1 of the Periodic Table of the Elements, such as NaOH, KOH and LiOH.

The chief advantage of the alkaline electrolytes is that traditional Pt/Ru catalysts oxidize methanol and most hydrocarbon fuels at least 20-times faster than acid electrolytes.

Because they also accelerate the cathode oxygen reduction reaction (ORR), less catalyst is required for a given power density. Also, OH⁻ solutions do not require pre-heating, are less corrosive on metal catalysts and electrode structures and are generally more stable than acids other than phosphoric acid.

DMAFC have an important disadvantage that has made their use impractical. Prior art DMAFC end products from complete oxidation of methanol or any comparable hydrocarbon fuel are water and carbonates, $CO_3^=$. The carbonates are formed by the alkaline electrolyte's capture of gaseous $CO_2$. $CO_2$ capture depletes the OH⁻ ion concentration in the electrolyte and the ions must be replaced. While this is not a difficult chemical step for this invention, reconditioning electrolyte to remove carbonates and replace hydroxyl ions adds to the BOP requirement and is an important disadvantage for mobile applications.

DMAFC of this invention provide one method to mitigate, if not altogether eliminate, the difficulty of reconditioning electrolyte by mixing some electrolyte with the liquid fuel as methanol enters the cell. This mixture will initiate a multi-step chemical reaction within the anode's reaction zone in which the last step is production of $CO_2$ as a gas at comparatively lower temperatures and pressures of the liquid fuel. $CO_2$ gas will form at or very near the electrode/electrolyte interface (see FIG. 2C and FIG. 5B) where it can be quickly sequestered by the TVF as bubbles (e.g., 76) and expelled from the electrolyte chamber (e.g., 24) before a significant amount of $CO_2$ gas goes into solution to appropriate hydroxyl during the formation of carbonates. Rapid recirculation of electrolyte can substantially mitigate $CO_2$ sequestration.

An alternative method of operating a DMAFC comprises operation at substantially elevated temperature of at least 250° C., and somewhat less pressure than described for DMFC. In addition to choices from a much wider range of catalyst options, the higher temperatures drive the fuel and reaction products to gasses—not carbonate precipitates. At 250° C. and above, CO becomes a fuel in alkaline electrolyte, rather than a catalyst poison, because it is further oxidized to $CO_2$ which will not dissolve rapidly in the alkaline electrolyte at the elevated temperature. Therefore, the alkaline electrolyte will require less replenishment.

Alkali-Electrolyte DRFC Fueled by Sodium Borohydride

DRFC fueled by a borohydride containing a cation from Group 1 of the Periodic Table of the Elements, such as sodium borohydride, $NaBH_4$, or potassium borohydride, $KBH_4$, and using an alkaline electrolyte are called Direct Borohydride Fuel Cells (DBFC). As with DMAFC, the best electrolytes for DBFC are hydroxyl ion electrolytes containing a cation from Group 1 of the Periodic Table of the Elements, such as KOH, NaOH and LiOH.

DBFC operate in a fashion similar to that described for the low or elevated temperature DMAFC, except that $CO_2$ is not produced and there is no hydroxyl ion sequestration. Borohydrides are sold as powders and must be diluted to concentrations of 30 to 50% molar in alkaline electrolyte, generally KOH or NaOH, to be usable in stable solution as fuels. The fuel remains a liquid, even at higher temperatures in the range of 250 to 350° C.

Complete fuel oxidation produces less-soluble borate, $NaBO_2$ that will precipitate after reaching about 15% molar concentration in alkaline electrolyte. That borate concentration will not degrade the electrolyte and will not increase as more borate precipitate is produced to be sequestered by TVF and collected in the electrolyte recirculation chamber of BOP.

As expected, the borohydride fuels are very chemically reactive. Therefore, it is essential to coat or cover the entire fuel path from storage, through the electrode porous metal support structure to, but not including the catalyzed reaction zone, with a suitable dielectric (non-metal) such as carbon or PTFE in order to prevent hydrolysis of the fuel.

Borohydride fuels cost much more than hydrocarbon fuels. Nevertheless, DBFC are well suited for specialized applications where high-energy or high-power per unit-weight or unit-size requirements are beyond the capabilities of other DRFC.

CONCLUSION

The DRFC and catalytic electrodes of this invention offer electrochemical energy conversion systems far exceeding the long-standing 1-Ampere/cm² fuel cell electrode performance barrier of the prior art. While the present disclosure has been presented above with respect to the described and illustrated embodiments of DRFC using TVF and CCF, it is to be understood that the disclosure is not to be limited to those alternatives and described embodiments.

I claim:

1. A fuel cell (10) containing electrolyte between its cathode (12) and anode (18) electrodes comprising:
   means (12, 18, 52) for creating Taylor Vortex Flows (54) in the electrolyte.

2. The fuel cell (10) of claim 1, configured as a direct reaction fuel cell, and comprising in addition:
   means (36, 38) for pumping high-hydrogen-content fuel through the anode (18).

3. The fuel cell (10) of claim 1 comprising in addition:
   means (12, 18, 52, 54) for creating Circular Couette Flows (56) in the electrolyte.

4. The fuel cell (10) of claim 3, configured as a direct reaction fuel cell, and comprising in addition:
   means (36, 38) for pumping high-hydrogen-content fuel through the anode (18).

5. The fuel cell (10) of claim 1 wherein:
   one electrode (12 or 18) rotates relative to the other electrode (18 or 12).

6. The fuel cell (10) of claim 5, configured as a direct reaction fuel cell, and comprising in addition:
   means (36, 38) for pumping high-hydrogen-content fuel through one of the electrodes (12 or 18).

7. The fuel cell (10) of claim 5 wherein:
   The Taylor Vortex Flows (54) flow in an axial direction with respect to the rotation of the rotating electrode (12 or 18).

8. The fuel cell (10) of claim 5 wherein:
   one of the electrodes (12 or 18) rotates within the other.

9. The fuel cell (10) of claim 8, configured as a direct reaction fuel cell, and comprising in addition:
   means (36, 38) for pumping high-hydrogen-content fuel through one of the electrodes (12 or 18).

10. The fuel cell (10) of claim 5 wherein:
    one of the electrodes (12 or 18) has a cylinder-like geometry.

11. The fuel cell (10) of claim 10, configured as a direct reaction fuel cell, and comprising in addition:
    means (36, 38) for pumping high-hydrogen-content fuel through one of the electrodes (12 or 18).

12. The fuel cell (10) of claim 5 in which:
    a. one electrode (12 or 18) is reactive with a first chemical entering its pores from its first surface (31 or 40) to produce a first ion at its second surface layer (14 or 20); and
    b. the other electrode (18 or 12) is reactive with a second chemical entering its pores from its first surface (40 or 30) to produce a second ion at its second surface layer (20 or 14) having a charge different from that of the first ion.

13. The fuel cell (10) of claim 12, comprising:
   means for controlling entry of a chemical into pores of an electrode (12 or 18) so that reaction-time:residence-time $(t_d/t_r) \leq 1/10$.

14. The fuel cell of claim 12, configured as a direct reaction fuel cell, wherein:
   one of the chemicals is a high-hydrogen-content fuel.

15. The fuel cell (10) of claim 1 in which the means (12, 18, 52) for creating Taylor Vortex Flows (54) includes a first cylindrical electrode surface layer (14 or 20) enclosing a second cylindrical electrode surface layer (20 or 14) separated from the first by an electrolyte chamber (24) of gap distance d and length L and means for rotating one electrode surface with respect to the other at $\Omega$ radians per second, further comprising:
   a. means for pumping electrolyte into and out of the chamber (24) at a total volumetric exchange rate of $\dot{U}/U$ where U is the volume of electrolyte in the chamber and $\dot{U}$ is the volumetric rate of flow into and out of the chamber; and
   b. means for regulating the volumetric exchange rate of axial flow and Taylor Number $T_c$ of vortex flow (54) in the electrolyte so that—
      i. $T_c = 2r_2\Omega^2 d^3/\nu^2(1+\{r_1/r_2\}) > 1,715(f\{R_a\})$, and;
      ii. $R_c = \{\Omega r_1 d/\nu\} \leq 10^4$
      where:
         1. $f\{R_a\} = 1.0 + (0.297)(\log_{10} R_a)^{4.04342}$ for $R_a \geq 1.0$
            $f\{R_a\} = 1.0$ for $0 \leq R_a \leq 1.0$,
         2. $r_1$=radius of the first electrode (36),
         3. $r_2$=radius of the second electrode (34),
         4. $d = r_1 - r_2$,
         5. $\nu$=kinematic viscosity of electrolyte=$\mu$(poise)/p (grams/cc.),
         6. $R_a = (dL/\nu)(\dot{U}/U)$, and
         7. $\dot{U}/U \geq 0$.

16. The fuel cell (10) of claim 15, configured as a direct reaction fuel cell, and comprising in addition:
   means (36, 38) for pumping high-hydrogen-content fuel through one of the surface layers (14, 20).

17. The fuel cell (10) of claim 15 wherein RPM=30$\Omega/\pi$, and comprising in addition:
   means for controlling the rotating means so that coordinates of d and RPM are within a Zone of Operable Parameters (80).

18. A fuel cell (10) containing first and second electrodes (12, 18) separated by a fluid electrolyte in a gap (d) between the electrodes (12, 18), comprising:
   means (54) for extracting unwanted contaminants (76) from the electrolyte, wherein the means for extracting unwanted contaminants (76) from the electrolyte include: means (12, 18, 52) for creating Taylor Vortex Flows (54) in the electrolyte.

19. The fuel cell (10) of claim 18 in which the means (12, 18, 52) for creating Taylor vortex flows (54) includes a first electrode (12) adjacent a second electrode (18) separated from the first by an electrolyte chamber (24) with—
   i. gap distance d,
   ii. gap length L, and
   iii. means for rotating one electrode (12 or 18) with respect to the other electrode (18 or 12) at $\Omega$ radians per second, further comprising:
      a. means for pumping electrolyte into and out of the chamber (24) at a total volumetric exchange rate of $\dot{U}/U$ where U is the volume of electrolyte in the chamber and $\dot{U}$ is the volumetric rate of flow into and out of the chamber (40); and
      b. means for regulating the volumetric exchange rate of axial flow and Taylor Number $T_c$ of vortex flow in the electrolyte so that—

$$T_c = 2r_2\Omega^2 d^3/\nu^2(1+\{r_1/r_2\}) > 1,715(f\{R_a\}), \text{ and};$$

$$R_c = \{\Omega r_1 d/\nu\} \leq 10^4$$

where:
   1. $f\{R_a\} = 1.0 + (0.297)(\log_{10} R_a)^{4.04342}$ for $R_a \geq 1.0$
      $f\{R_a\} = 1.0$ for $0 \leq R_a \leq 1.0$
   2. $r_1$=the largest radius of the first electrode,
   3. $r_2$=the smallest radius of the second electrode,
   4. $\nu$=kinematic viscosity of electrolyte=$\mu$(poise)/p (grams/cc.),
   5. $R_a = (dL/\nu)(\dot{U}/U)$, and
   6. $\dot{U}/U \geq 0$.

20. The fuel cell (10) of claim 19, configured as a direct reaction fuel cell, and comprising in addition:
   means (36, 38) for pumping high-hydrogen-content fuel through one of the electrodes (12, 18).

21. The fuel cell (10) of claim 18, configured as a direct reaction fuel cell, and comprising in addition:
   means (36, 38) for pumping high-hydrogen-content fuel through one of the electrodes (12 or 18).

22. A fuel cell (10) comprising:
   a. a first electrode (12) that is—
      i. reactive with a first chemical entering its pores from its first surface (31) to produce a first ion at its second surface layer (14);
   b. a second electrode (18) that is—
      i. reactive with a second chemical entering its pores from its first surface (40) to produce a second ion at its second surface layer (20) having a charge different from that of the first ion, and
      ii. adjacent the first electrode (12) so that a chamber (24) is created between the second surface layers (14 and 20) of the two electrodes (12 and 18);
   c. a fluid electrolyte in the chamber (24); and
   d. means for moving one electrode (12 or 18) with respect to the other electrode (18 or 20) to create flow (54) in the fluid electrolyte
so as to generate a voltage across the electrodes (12, 18) that are adapted to be connected to an external electrical circuit load (50).

23. The fuel cell (10) of claim 22, configured as a direct reaction fuel cell, and comprising in addition:
   means (36, 38) for pumping high-hydrogen-content fuel through one of the electrodes (12, 18).

24. The fuel cell (10) of claim 22 wherein:
   a. the first electrode (12) is cylinder-like and its second surface is its inner surface layer (14); and
   b. the second electrode (18) is cylinder-like and its second surface is its outer surface layer (20) that is located substantially parallel to and within the first cylinder-like electrode (12) so as to create the chamber (24) for the electrolyte between the electrode surface layers (14 and 20).

25. A fuel cell (10) comprising:
   a. A first cylinder-like electrode (12) that is—
      i. reactive with a first chemical within its pores to produce a first ion at its inner surface layer (14), and
      ii. adapted to be connected to one electrical terminal (46 or 48) of an electrical circuit load (50);

b. A second cylinder-like electrode (18) that is—
   i. reactive with a second chemical within its pores to produce a second ion at its outer surface layer (20) having a charge different from that of the first ion,
   ii. smaller in diameter than the first electrode inner surface (14) and having an axis substantially parallel to that of the first electrode (12),
   iii. within the first electrode inner surface (14) so that a chamber (24) is created between facing surface layers (14 and 20) of the two electrodes (12 and 18), and
   iv. adapted to be connected to another electrical terminal (46 or 48) of the electrical circuit load (50);
c. A fluid electrolyte in the chamber (24); and
d. Means for axially rotating one electrode (12 or 18) with respect to the other electrode (18 or 20) to create Taylor Vortex Flows (54) in the fluid electrolyte
so as to generate a voltage across the electrodes (12 and 18).

26. The fuel cell (10) of claim 25 in which one chemical is an oxidizer and the other is a reductant.

27. The fuel cell (10) of claim 25 wherein a chemical has a reaction time ($t_a$) within its electrode (12 or 18) pores and comprising in addition:
   means for causing the chemical to pass through its electrode (12 or 18) reaction zone in a length of time ($t_r$) that is at least 10 times the chemical conversion reaction time ($t_a$) within its electrode (36 or 34).

28. A process for operating a fuel cell (10) to produce electricity for transmission to an external electrical circuit load comprising:
   a. Pumping a high-hydrogen-content fuel through an anode electrode (18) of the fuel cell (10);
   b. Pumping an oxidizer through a cathode electrode (12) of the fuel cell (10);
   c. Pumping electrolyte into an electrolyte chamber (24) of the fuel cell (10) that is located between the electrodes (12 and 18); and
   d. Rotating one electrode (12 or 18) with respect to the other electrode (18 or 12) at a rate sufficient to cause electrolyte Taylor Vortex Flows (54) in the electrolyte chamber (24).

29. A fuel cell (10) comprising:
   a. viscous fluid Taylor Vortex Flows (54); and
   b. a catalyst surface layer (14 or 20) supported in a laminar flow (56) generated by the Taylor Vortex Flows (54).

30. The fuel cell (10) of claim 29 wherein:
   a. the catalyst surface layer (14 or 20) is cylindrical-like and is adjacent a second cylindrical-like surface (18 or 12), and
   b. one of the cylindrical-like surfaces (12, 14 or 18, 20) is rotated to produce the Taylor Vortex Flows (54) between the two cylindrical-like surfaces (12, 14, 18, 20).

31. The fuel cell (10) of claim 29 wherein:
the catalyst surface layer (14 or 20) comprises an element selected from the Platinum Metals Group.

32. The fuel cell (10) of claim 29 wherein:
the viscous fluid is an electrolyte.

33. The fuel cell (10) of claim 32 wherein:
the electrolyte is alkaline.

34. The fuel cell (10) of claim 33 wherein the alkaline electrolyte contains:
an element from Group 1 of the Periodic Table of Elements.

35. The fuel cell (10) of claim 32 wherein:
the electrolyte is acidic.

36. The fuel cell (10) of claim 29, configured as a direct reaction fuel cell, and comprising in addition:
   means (36, 38) for pumping high-hydrogen-content fuel through the catalyst surface layer (14 or 20).

37. The fuel cell (10) of claim 36 wherein:
the fuel is a hydrocarbon.

38. The fuel cell (10) of claim 37 wherein:
the hydrocarbon contains an alkane.

39. The fuel cell (10) of claim 37 wherein:
the hydrocarbon contains an alcohol.

40. The fuel cell (10) of claim 37 wherein:
the hydrocarbon contains kerosene.

41. The fuel cell (10) of claim 36 wherein:
the fuel is a borohydride.

42. The fuel cell of claim 41 wherein:
the borohydride contains a cation from Group 1 of The Periodic Table of the Elements.

43. The fuel cell (10) of claim 42 wherein the cation from Group 1 of The Periodic Table of the Elements is:
sodium.

44. The fuel cell (10) of claim 29 wherein the catalyst surface layer (14 or 20) comprises:
   protuberances (132) extending from catalyst surface layer (14 or 20) into the laminar flow (56).

45. The fuel cell (10) of claim 44 wherein:
the protuberances (150) are streamlined.

46. The fuel cell (10) of claim 44 wherein the catalyst surface layer (14 or 20) comprises:
   a plurality of catalyst layers (152, 154, 156, 156, 160).

47. The fuel cell (10) of claim 44 wherein the protuberances (132) comprise:
   a sparse mesh of fine filaments (134).

48. The fuel cell (10) of claim 47 wherein the sparse mesh of fine filaments (134) contains:
   aggregate carbon balls (136).

49. The fuel cell (10) of claim 48 wherein the aggregate carbon balls (138) are decorated by:
   particles (136) of a metal selected from the Periodic Table of the Elements Platinum Metals Group.

50. The fuel cell (10) of claim 48 wherein the aggregate carbon balls (138) are decorated by:
   particles (136) of a metal selected from the Periodic Table of the Elements Group 10.

51. The fuel cell (10) of claim 47 wherein the sparse mesh of fine filaments (134) is decorated by:
   particles (136) of a metal selected from the Periodic Table of the Elements Platinum Metals Group.

52. The fuel cell (10) of claim 47 wherein the sparse mesh of fine filaments (134) is decorated by:
   particles (136) of a metal selected from the Periodic Table of the Elements Group 10.

53. The fuel cell (10) of claim 29 wherein the catalyst surface layer (14 or 20) comprises:
nanoporous metal foam sponge (140).

54. The fuel cell (10) of claim 53 wherein the nanoporous metal foam sponge (140) comprises:
   a metal alloy in which one element has been removed by selective dissolution.

55. The fuel cell (10) of claim 54 wherein the metal alloy comprises:
   face-centered-cubic structural geometry.

56. The fuel cell (10) of claim 55 wherein the face-centered-cubic structural geometry of the metal alloy has:
   a Miller Index of (1 1 1).

57. The fuel cell (10) of claim 54 wherein the metal alloy comprises:
   a perovskite structure.

58. The fuel cell (10) of claim 53 wherein the nanoporous metal foam sponge (140) is:
decorated with catalytic particles (136) of metal selected from the Platinum Metals Group.

59. The fuel cell (10) of claim 53 wherein the nanoporous metal foam sponge (140) is:
decorated organic catalytic particles (136).

60. The fuel cell (10) of claim 53 wherein the nanoporous metal foam sponge (140) contains:
a metal from the Platinum Metals Group.

61. The fuel cell (10) of claim 60 wherein the metal is:
a platinum alloy.

62. The fuel cell (10) of claim 61 wherein the platinum alloy contains:
ruthenium.

63. The fuel cell (10) of claim 53 wherein:
the nanoporous metal foam sponge (140) is secured to substrates (30,40).

64. The fuel cell (10) of claim 53 wherein:
the nanoporous metal foam sponge (140) is coated with a high-molecular-weight compound.

65. A fuel cell (10) comprising:
a. a cathode electrode (12, 14),
b. an anode electrode (18, 20),
c. a fluid electrolyte between the electrodes (12, 14, 18, 20),
d. means (52, 12, 14, 18, 20) for generating a vortex (54) in the electrolyte that is enveloped by a laminar shear boundary (56) adjacent one of the electrodes (12, 14, 18, 20).

66. A fuel cell battery (200) comprising:
a. A rotating shaft (206);
b. At least two fuel cells (202x) each having a rotating electrode (204x) that is fixed to the rotating shaft (206) and spins within another electrode (208x), not fixed to the rotating shaft (206),
  i. the rotating electrode (204x) of the first cell (202A, 202C) being an anode (204A, 202C) and the other electrode (208A, 208C) of the first cell (202A, 202C) being a cathode, and
  ii. the rotating electrode of the second cell (202B, 202D) being a cathode (204B, 204D) and the other electrode (208B, 208D) of the second cell (202B, 202D) being an anode;
c. electrolyte chambers (224x) between the anodes (204A, 208B, 204C, 208D) and the cathodes (208A, 204B, 208C, 204D);
d. means for spinning the rotating shaft (206) at a rate sufficient to cause Taylor Vortex Flows (224x) to form in the electrolyte chambers (224x); and
e. a busbar (232AB, 234BC) providing an electrical connection (230) between the anode (204A, 208B) in one cell (202A, 202B) and the cathode (204B, 208C) in the other cell (202B, 202C).

67. The fuel cell battery (200) of claim 66, configured as a direct reaction fuel cell battery, wherein the two fuel cells (202A, 202B) are direct reaction fuel cells and comprising in addition:
means (216, 212A, 220B, 214B) for pumping high-hydrogen-content fuel through the anode (204A, 208B) of each cell fuel cell (202A, 202B).

68. The fuel cell battery (200) of claim 67 having a cathode electrode (208A, 208C) in the first cell (202A, 202C) and an anode electrode (208B, 208D) in the second cell (202B, 202D) and comprising in addition:
a. a battery terminal (228) electrically connected (230) to the cathode electrode (208A); and
b. a battery terminal (236) electrically connected (230) to the anode electrode (208D).

69. A fuel cell battery (200) comprising:
a. a rotating shaft (206);
b. two fuel cells (202A, 202D) each having a rotating electrode (204A, 204D) that is fixed to the rotating shaft (206) and spins within another electrode (208x), not fixed to the rotating shaft (206), the rotating electrode (204A) of the first cell (202A) being an anode (204A) and the rotating electrode of the second cell (202D) being a cathode (204D);
c. a cathode electrode (208A) in the first cell (202A) separated from a first cell anode (204A) by an electrolyte chamber (224A);
d. means for spinning the rotating shaft (206) at a rate sufficient to cause Taylor Vortex Flows (224x) to form in the electrolyte chambers (224x);
e. a battery terminal (228) electrically connected (230) to the cathode electrode (208A);
f. an anode electrode (208D) in the second cell (202D) separated from a second cell cathode (204D) by an electrolyte chamber (224D);
g. a battery terminal (236) electrically connected (230) to the anode electrode (208D); and
h. an electrical circuit (230) connection between the rotating anode (204A) battery terminal (236) and the rotating cathode (204D) battery terminal (228).

70. The fuel cell battery (200) of claim 69, configured as a direct reaction fuel cell battery, wherein the two fuel cells (202A, 202D) are direct reaction fuel cells and comprising in addition:
means (216, 212A, 220D, 214D) for pumping high-hydrogen-content fuel through the anode (204A, 208D) of each cell fuel cell (202A, 202D).

* * * * *